United States Patent
Ikeda et al.

(10) Patent No.: US 7,333,220 B2
(45) Date of Patent: Feb. 19, 2008

(54) IMAGE FORMING DEVICE PROVIDING DOCUMENT READING MODE AND IMAGE RECORDING MODE

(75) Inventors: Akihiro Ikeda, Oobu (JP); Atsushi Isozaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 987 days.

(21) Appl. No.: 10/705,474

(22) Filed: Nov. 12, 2003

(65) Prior Publication Data

US 2004/0109189 A1    Jun. 10, 2004

(30) Foreign Application Priority Data

Dec. 10, 2002  (JP) ............................. 2002-358372

(51) Int. Cl.
*B41F 21/00* (2006.01)
*B41J 17/02* (2006.01)

(52) U.S. Cl. .................... 358/1.13; 358/472; 271/4.08; 271/9.01; 271/9.04

(58) Field of Classification Search ......... 358/1.1–1.8, 358/1.11–1.18, 400, 412; 271/4.08, 9.01, 271/9.04, 10.09

See application file for complete search history.

(56) References Cited

U.S. PATENT DOCUMENTS

| 5,971,386 | A  | 10/1999 | Jean et al. |
| 6,285,469 | B1 | 9/2001  | Tuli |
| 2002/0118395 | A1 | 8/2002 | Isozaki et al. |

FOREIGN PATENT DOCUMENTS

| EP | 0 505 969 A2 | 9/1992 |
| JP | 08-259101 A  | 10/1996 |
| JP | 11-284779 A  | 10/1999 |
| JP | 2002-037482 A | 2/2002 |
| JP | A 2002-257210 | 9/2002 |

*Primary Examiner*—King Y. Poon
*Assistant Examiner*—Lennin R Rodriguez
(74) *Attorney, Agent, or Firm*—Oliff & Berridge PLC

(57) ABSTRACT

An image forming device providing a document image reading mode, image recording mode, copying mode, recording sheet feeding mode, and recording sheet discharge mode. When interruption of feeding of a document or a recording sheet is detected by a sensor, the current driving force transmission path is switched and set to another driving force transmission path corresponding to an operation mode different from the current operation mode at which the interruption occurs.

10 Claims, 16 Drawing Sheets

IMAGE FORMING DEVICE PROVIDING DOCUMENT READING MODE AND IMAGE RECORDING MODE

BACKGROUND OF THE INVENTION

The present invention relates to an image forming device, such as a facsimile device, and more particularly to an image forming device having a driving force transmission mechanism for transmitting a driving force of a drive motor to a sheet feeding mechanism.

In a driving device for a facsimile device in the related art, to meet requirements, such as a reduction in device size and a reduction in cost, a driving force of a single drive motor is switch-transmitted by means of a driving force transmission mechanism to a plurality of driving members, such as feed rollers for feeding recording sheets, and feed rollers for feeding documents. For example, in a facsimile device equipped with a driving device as disclosed in U.S. patent application Publication Ser. No. 2002/0118395, the destination to which the driving force is to be transmitted by the driving force transmission mechanism is switched according to the operation mode, such as the image reading mode or the recording mode, so as to transmit the driving force of the drive motor solely to the selected feed rollers required to be driven for the selected operation mode.

FIG. 1 is a schematic diagram showing an example of the driving force transmission mechanism in a facsimile device of a related art.

This driving force transmission mechanism includes a sun gear 43, a rotary member 45, two planetary gears 46, 47, a motor gear 82, four transmission gears 61, 62, 63, 64 and a sensor switch 80. The sun gear 43 includes a large diameter gear 43A and a small diameter gear 43B coaxially and integrally with the large diameter gear 43A. The rotary member 45 is provided coaxial with the sun gear 43, and is selectively connected to the sun gear 43 through a one-way clutch (not shown). The rotary member 45 is formed into a disc-like shape and has an outer peripheral portion provided with five recesses 60 and five projections 60' arrayed alternately in a circumferential direction with circumferential lengths different from each other. The two planetary gears 46 and 47 are provided at predetermined positions on the surface of the rotary member 45 facing the sun gear 43 so as to be in meshing engagement with the small diameter gear 43B of the sun gear 43. The motor gear 82 is fastened to the rotor of a drive motor (not shown) and is in meshing engagement with the large diameter gear 43A of the sun gear 43. The four transmission gears 61, 62, 63, and 64 are provided at predetermined positions about the sun gear 43. Each transmission gear is meshedly engageable with the planetary gears 46 and 47 when the planetary gears 46 and 47 are orbitally moved about the sun gear 43. The sensor switch 80 is provided at an appropriate position about the sun gear 43 and adapted to detect the recesses 60 and projections 60' formed in the outer periphery of the rotary member 45 as the rotary member 45 rotates.

The five projections 60' of the rotary member 45 is includes one elongated projections 60a' and four shortened projections 60b'. Similarly, the five recesses 60 of the rotary member 45 includes one elongated recess 60a and four shortened recesses 60b. Assuming that a position of the elongated projection 60a' is a reference position, the elongated recess 60a is situated at a position spaced apart from the reference position by approximately 225 degrees as measured counterclockwise therefrom in FIG. 1.

When the sun gear 43 rotates counterclockwise, the rotary member 45 is connected to the sun gear 43 by the one-way clutch, and rotates with the sun gear 43. When the sun gear 43 rotates clockwise, connection with the sun gear 43 is canceled, so that the rotary member 45 does not rotate. Further, a rotation regulating member 51 is provided for preventing the rotary member 45 from rotating in a clockwise direction (reverse rotational direction) when the rotary member 45 is set at a predetermined position corresponding to the operation mode, such as the image reading mode or the recording mode.

The transmission gear 61 is adapted for transmitting the driving force of the drive motor (not shown) to a feed roller (not shown) by way of the sun gear 43 for feeding recording sheets. The transmission gear 62 is adapted for transmitting the driving force to a spool (not shown) for taking up the ink ribbon and to a platen (not shown) for feeding the recording sheets at the printing position. The transmission gear 63 is adapted for transmitting the driving force to a feeding roller (not shown) for discharging recording sheets that have undergone printing. The transmission gear 64 is adapted for transmitting the driving force to a document feeding roller (not shown) for feeding documents, and to a line feed roller (not shown) and to a document discharge roller (not shown).

Driven gears 75, 74, and 73 are respectively fixed to the shafts of the document feeding roller, the line feed roller, and the document discharge roller. A driven gear 72 is provided between the driven gear 74 and the driven gear 73 and is meshedly engaged therewith to make the rotating directions of the driven gear 74 in coincidence with that of the driven gear 73. Further, the driven gear 72 is connected to the transmission gear 64 through a driven gear 71 for speed reduction.

In the facsimile device of related art, in order to transmit the driving force of the drive motor to the proper roller to be driven for performing the desired operation mode such as the image reading mode and the recording mode, the rotary member 45 is rotated counterclockwise to a position where the planetary gears 46 and 47 are engaged with the desired one of the transmission gears 61,62, 63, 64 those connected to these rollers. The rotating position of the rotary member 45 is detected upon detection to the recesses 60 of the rotary member 45 by the sensor switch 80.

FIG. 1 shows a state in which the facsimile device has been set to the image reading mode. In this state, the driving force transmission mechanism is adjusted such that the rotary member 45 is at a position where the planetary gear 46 is in meshing engagement with the transmission gear 64 connected to the document feeding roller for feeding documents, the line feed roller, and the document discharge roller. The setting of the rotary member 45 to the position corresponding to the image reading mode is effected by rotating the sun gear 43 counterclockwise, causing the sensor switch 80 to detect the shortened recess 60b provided on the left side of the elongated projection 60a', whereupon the planetary gear 46 is brought into meshing engagement with the transmission gear 64, and the rotation regulating member 51 prevents the rotary member 45 from rotating in the clockwise direction.

When the rotary member 45 is set to the position corresponding to the image reading mode, the planetary gear 46 is in mesh with the transmission gear 64 as shown in FIG. 1, so that the driving force of the drive motor can be transmitted to the transmission gear 64 by way of the sun gear 43 and the planetary gear 46. Further, the driving force of the drive motor can be transmitted to the driven gears 75, 74, and 73 fixed to the shafts of the document feeding roller, the line feed roller, and the document discharge roller by way of the driven gears 71 and 72.

When transmitting the driving force of the drive motor to the driven gears 75, 74, and 73, the sun gear 43 is rotated clockwise as indicated by the arrow in FIG. 1. As is apparent from driving connection among the planetary gear 46, the transmission gear 64, and the driven gears 71 through 75 as shown in FIG. 1, when the sun gear 43 is rotated clockwise, the driven gear 75 for driving the document feeding roller rotates clockwise, whereas the driven gear 74 for driving the line feed roller and the driven gear 73 for driving the document discharge roller rotate counterclockwise. The rotating direction of the driven gear 75 and that of the driven gears 74 and 73 are opposite to each other because the document feeding roller feeds a document to the line feed roller side (to the right in FIG. 1) while in pressure contact with the obverse surface of the document, whereas the line feed roller and the document discharge roller feed the document to a discharge opening (not shown) side (to the right in FIG. 1) while in pressure contact with the reverse surface of the document.

Thus, in the image reading mode, the rotary member 45 is set to the state as shown in FIG. 1, and the drive motor is rotated counterclockwise. Accordingly, the driving force is transmitted to the driven gears 73 through 75 by way of the sun gear 43, the planetary gear 46, the transmission gear 64, and the driven gears 71 and 72, and as a result, the driven gears 73 and 74 and the driven gear 75 rotate counterclockwise and clockwise, respectively, to thereby feed the document.

In the above-described driving device, in which the driving force of a single drive motor is switch-transmitted to a selected one of the plurality of feeding rollers for providing a selected one of the operation modes by way of the driving force transmission mechanism, the following problem may occur. When sheet jamming or the like occurs during feeding of a document or a recording sheet and the feeding operation is stopped, the user attempts to pull out the document or the recording sheet toward the upstream side with respect to the feeding direction in order to remove the sheet or the document. However, the document or the recording sheet will be constrained by the feeding roller, making it impossible to deal with the jamming, and in some cases, the document or the recording sheet may suffer damage and remain in the feeding path.

For example, in the image reading mode, during feeding of a document the document feeding operation is stopped due to document jamming or the like, and the user pulls the document toward the upstream side with respect to the feeding direction in an attempt to remove the document. This pulling action imparts document feed roller to rotate counterclockwise, and at the same time, imparts the line feed roller and the document discharge roller to rotate clockwise. Thus, a counterclockwise torque is applied to the driven gear 75, and a clockwise torque is applied to the driven gears 73 and 74. That is, the driven gears 73 through 75, to which the planetary gear 46 is drivingly connected through the intermediation of the driven gears 71 and 72 and the transmission gear 64, receive a force causing the driven gears 73 through 75 to rotate in a direction opposite to the document feeding direction.

When the force is applied to the driven gears 73 through 75 for rotating the driven gears 73 through 75 in a direction opposite to the document feeding direction, a counterclockwise torque is applied to the transmission gear 64, with the result that a clockwise torque is applied to the planetary gear 46, and that a counterclockwise torque is applied to the sun gear 43. However, since the rotation of the sun gear 43 is restricted by the motor gear of the drive motor, rotations of the planetary gear 46, the transmission gear 64, and the driven gears 71 through 75 drivingly connected to the sun gear 43 are also restricted.

As a result, none of the document feeding roller, the line feed roller, and the document discharge roller those nipping the document, can rotate. Accordingly, if the user pulls the document toward the upstream side, a frictional force between the feeding rollers such as the document feeding roller and the document increases to cause the document to be constrained by the feeding rollers, making it impossible to deal with the jamming. In some cases, this may damage the document.

Incidentally, when the user performs the operation of pulling the document toward the downstream side in FIG. 1, a clockwise torque is applied to the transmission gear 64, and a counterclockwise torque is applied to the planetary gear 46. Thus, when the gears 64 and 46 rotate clockwise and counterclockwise, respectively, the planetary gear 46 moves slightly counterclockwise to cancel the engagement between the two gears, and the transmission gear 64 becomes free. Therefore, upon the document pulling action in the downstream side, all of the document feeding roller, the line feeding roller, and the document discharge roller can rotate, thus involving no such problem incurred when pulling the document toward the upstream side.

The above-described problem also occurs in case of feeding a recording sheet.

SUMMARY OF THE INVENTION

It is an object of the present invention to overcome the above-described drawbacks, and to provide an image forming device capable of removing jammed sheet (a document or a recording sheet) in the sheet inserting direction when the sheet feeding operation is accidentally stopped.

This and other objects of the present invention will be attained by an image forming device capable of providing at least a document reading mode and an image recording mode, the image forming device including a document feeder, a recording sheet feeder, a single drive motor, a drive force transmission mechanism, a first power transmission arrangement, a second power transmission arrangement, a first detection means and a control unit. The document feeder feeds a document in one direction in a document feed path for performing a document reading operation in the document reading mode. The recording sheet feeder feeds a recording sheet in one direction in a recording sheet feed path for recording an image on the recording sheet in the image recording mode. The drive force transmission mechanism is adapted for selectively transmitting a rotation of the drive motor to one of the document feeder and the recording sheet feeder in accordance with a selected operation mode. The driving force transmission mechanism provides at least a first position and a second position. The first power transmission arrangement drivingly connects the drive force transmission mechanism to the document feeder at the first position of the drive force transmission mechanism. The second power transmission arrangement drivingly connects the drive force transmission mechanism to the recording sheet feeder at the second position of the drive force transmission mechanism. The first power transmission arrangement is disconnectable from the drive force transmission mechanism when the second power transmission arrangement is drivingly connected to the recording sheet feeder. The first detection means detects interruption of feeding of one of the documents and the recording sheet at respective one of the document feed path and the recording sheet feed path. The control unit controls the drive force transmission mechanism for switching power transmission between a first transmission phase where the drive motor is drivingly connected to the document feeder through the first power transmission arrangement and a second transmission phase where the drive motor is drivingly connected to the recording sheet feeder through the second power transmission arrangement. The control unit includes first changing means for changing a current transmission phase to one of remaining transmission phases when the first detection means detects the interruption.

DETAILED DESCRIPTION OF THE PREFERRED EMBODIMENTS

An image forming device according to a preferred embodiment of the present invention will be described with reference to FIGS. 2 through 18.

Figure 1:
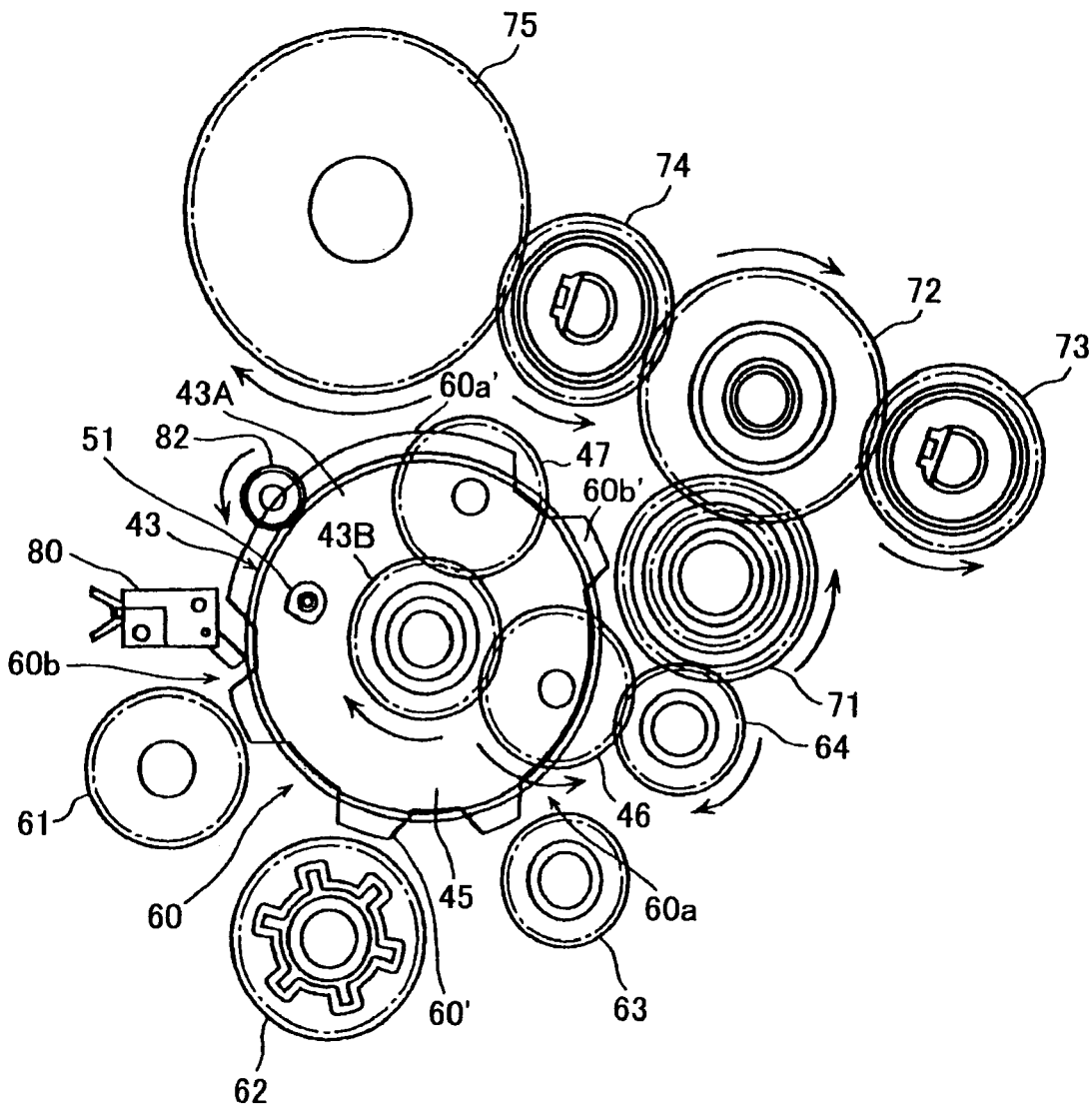
FIG. 1 is an explanatory diagram showing a driving force transmission mechanism in an image reading mode according to a facsimile device of related art.
Figure 2:
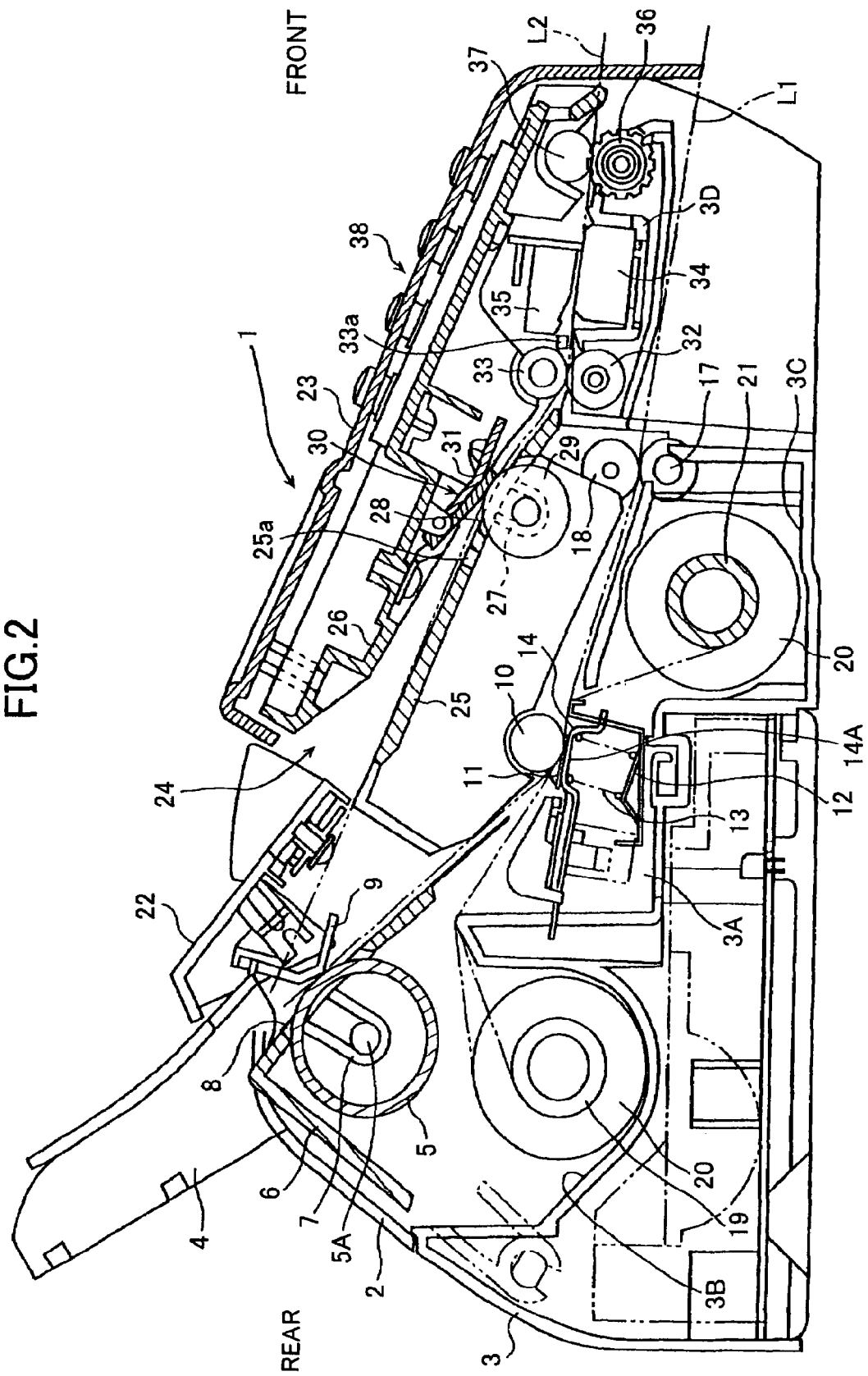
FIG. 2 is a side cross-sectional view of a facsimile device including a driving force transmission mechanism according to an exemplary embodiment of the present invention.

A facsimile device including a driving force transmission mechanism according to an exemplary embodiment is shown in FIG. 2. In addition to a facsimile transmission and reception function, a copy function is provided in the facsimile device.

As shown in FIG. 2, a facsimile device 1 includes an upper cover 2 and a lower cover 3. In the FIG. 2, the front side of the facsimile device 1 faces rightwardly, while the rearside of the facsimile device 1 faces leftwardly. Provided at a rear side of the upper cover 2 (upper left portion in FIG. 2) is a sheet stacker 4 on which recording sheets are stacked. A sheet feeding path L1 (a chain double-dashed line in FIG. 2) is formed from a lower side of the sheet stacker 4 to front side undersurface of the upper cover 2. A sheet pick-up roller 5 is disposed adjacent to the sheet stacker 4. The sheet pick-up roller 5 is driven by a drive motor 57 (shown in FIG. 4) and rotated through gears, which will be described in more detail below.

The sheet pick-up roller 5 is rotatably supported through a roller shaft 5A to a roller supporting portion 7 of a support plate 6 which is a L-shaped cross-section. A roller opening 8 is formed in the support plate 6 at its facing the sheet feeding path L1. An upper portion of the pick-up roller 5 partially protrudes the support plate 6 through a roller opening 8 to confront the sheet feeding path L1. A regulating member 9 is disposed in confrontation with the sheet pick-up roller 5, so as to resiliently press against a surface of the sheet pick-up roller 5. The regulating member 9 separates the recording sheets stacked on the sheet stacker 4 one by one in order that the plurality of the recording sheets stacked on the sheet stacker 4 will not be fed together by the sheet pick-up roller 5. The sheet pick-up roller 5 and the regulating member 9 cooperate to feed the recording sheets one by one, along a sheet feeding path L1.

A platen roller 10 is disposed at a substantially central portion of the sheet feeding path L1. The platen roller 10 is driven by the drive motor 57 and rotated through gears, which will be described in more detail. A thermal head 11 is disposed so as to face the platen roller 10. The thermal head 11 transfers an ink of an ink ribbon onto the recording sheet and forms an image on the recording sheet. The thermal head 11 is a line thermal head including heating elements which are arranged in an array. The thermal head 11 has a length approximately the same as the width of the recording sheet and the heating elements are provided in line so as to correspond to a printable width on the recording sheet. Thus, the thermal head 11 covers a printable area on the recording sheet. The thermal head 11 is secured on an upper surface of a head holding portion 14. The head holding portion 14 is bent into an inverted U-shape to protrude toward the thermal head 11. The head holding portion 14 is urged upwardly by an urging spring 13 provided between a spring holding member 12 and a recess 14A of the head holding portion 14, the recess 14A being provided on a side opposite to the platen roller 10. The thermal head 11 is pressed against the platen roller 10 with an urging force of the urging spring 13. The thermal head 11 is released from the platen roller 10 according to specific operation modes of the facsimile device 1. A mechanism for releasing the thermal head 11 is irrelevant to this invention, so that the mechanism is not described or illustrated herein.

A sheet discharge roller 17 is disposed downstream of the platen roller 10 at a right end portion of the sheet feeding path L1 (near a discharge opening of the recording sheet). A pinch roller 18 is disposed immediately above the sheet discharge roller 17, so as to press against the sheet discharge roller 17. The sheet discharge roller 17 is driven by the drive motor 57 and rotated through gears, which will be described in more detail. The sheet discharge roller 17 feeds the recording sheet downstream in the sheet feeding path L1, in cooperation with the pinch roller 18, to discharge the recording sheet from the facsimile device 1 after recording is performed.

A ribbon accommodating portion 3B is formed in the lower cover 3 below the sheet pick-up roller 5. A ribbon take-up portion 3C is formed between the thermal head 11 and the pinch roller 18. The ribbon accommodating portion 3B accommodates a roll of ribbon 20 wound around a cylinder 19. The ribbon 20 has a sufficient width to cover the area printable with the heating elements of the line thermal head 11. The ribbon 20 is taken from the ribbon accommodating portion 3B, passing between the platen roller 10 and the thermal head 11. Then, the ribbon 20 is taken up by a ribbon take-up spool 21 provided in a ribbon take-up portion 3C. The ribbon take-up spool 21 is driven by the drive motor 57 and rotated through gears, as described later, to take up the ribbon 20 used for recording.

A document feed mechanism will be described. A document tray 22 is formed on the upper cover 2 to the upper right side of the sheet stacker 4 in FIG. 2 (above the regulating member 9). A document insertion opening 24 is provided between the document tray 22 and an upper panel plate 23. A document feeding path L2 (a two-dotted chain line in FIG. 2) is formed from the document insertion opening 24 to a document discharge opening. The document discharge opening is formed substantially center of the front of the upper cover 2. A document supporting portion 25 is provided to the right downward side of the document tray 22 along a document feeding path L2 in FIG. 2. A document guiding portion 26 curved downwardly is provided above the document supporting portion 25 so as to face the document supporting portion 25. The document supporting portion 25 and the document guiding portion 26 form the document feed path L2, so as to gradually reduce the vertical distance between the portions 25 and 26 toward its downstream side along the path L2.

Provided at the underside of the document supporting portion 25 in the downstream side along the document feeding path L2, is a pair of roller supporting portions 27 (only one of which is shown in FIG. 2). A roller opening 28 is formed between the roller supporting portions 27. A document feeding roller 29 that separates a plurality of documents stacked on the document tray 22 one by one is rotatably supported in each of the roller supporting portions 27. An upper portion of the document feeding roller 29 is partially exposed above the document supporting portion 25 through the roller opening 28 to confront the sheet feeding path L2. A separation pad 31 is attached to the underside of the document guiding portion 26. The separation pad 31 contacts the surface of the document feeding roller 29 exposed through the roller opening 28 into the document supporting portion 25. The separation roller 29 and the separation pad 31 cooperate to separate and feed the documents one by one, functioning as a separation unit 30.

A first document sensor 25a for detecting a document on the document tray 22 is provided at a predetermined position of the document support portion 25 and near the roller support portion 27. The output of the first document sensor 25a is transmitted to a microcomputer described later.

Provided downstream of the separation roller 29 in the document feeding path L2 are a line feed (LF) roller 32 and a pinch roller 33 disposed above the LF roller 32 in nipping relation thereto. The LF roller 32 and the pinch roller 33 are rotatably supported. The LF roller 32 is driven by the drive motor 57 and rotated though gears, as described later. A second document sensor 33a for detecting a leading edge and a tailing edge of the fed document is provided at a predetermined position near downstream of the pinch roller 18. The output of the second document sensor 33a is transmitted to the microcomputer described later.

Signals indicative of the document-leading-edge and the document-trailing-edge those detected by the second document sensor 33a are utilized in controlling the document reading operation by a CIS unit 34 described later. That is, when the leading edge of a document is detected by the second document sensor 33a, document reading operation by the CIS unit 34 is started after a predetermined period of time (the period during which the leading edge of the document reaches the document reading position) has elapsed since the detection. When the trailing edge of the document is detected by the second document sensor 33a, the document reading operation by the CIS unit 34 is completed after a predetermined period of time (the period during which the trailing edge of the document reaches the document reading position) has elapsed since the detection.

The contact image sensor (CIS) unit 34 is provided at a position downstream of the LF roller 32 and the pinch roller 33. The CIS unit 34 is accommodated in a unit accommodating portion 3D disposed in the lower cover 3. A document pressing segment 35 presses against an upper portion of the CIS unit 34.

The CIS unit 34 reads image data on a document which is line-fed while passing between the LF roller 32 and the pinch roller 33. A document discharge roller 36 and a pinch roller 37 are disposed near the document discharge opening and downstream of the CIS unit 34 along the document feeding path L2. The pinch roller 37 is disposed above the document discharge roller 36 and presses against the document discharge roller 36. The document discharge roller 36 and the pinch roller 37 are rotatably supported. The document discharge roller 36 and the pinch roller 37 are adapted to discharge the document out of the facsimile device 1 after image data has been read by the CIS unit 34.

The upper panel plate 23 is provided with a keyboard 38 having numeral keys and various function keys. Various operations of the facsimile device 1 are performed when relevant keys are pressed. Also, a display portion (not shown in FIG. 2) is provided on the upper panel plate 23. An operation phase of the facsimile device 1 is displayed on the display portion to users.

The driving force transmission mechanism for selectively rotating the sheet pick-up roller 5, the platen roller 10, the ribbon take-up spool 21, the sheet discharge roller 17, the LF roller 32 and the document discharge roller 36 will be described, with referring to FIGS. 3 through 8.

Figure 3:
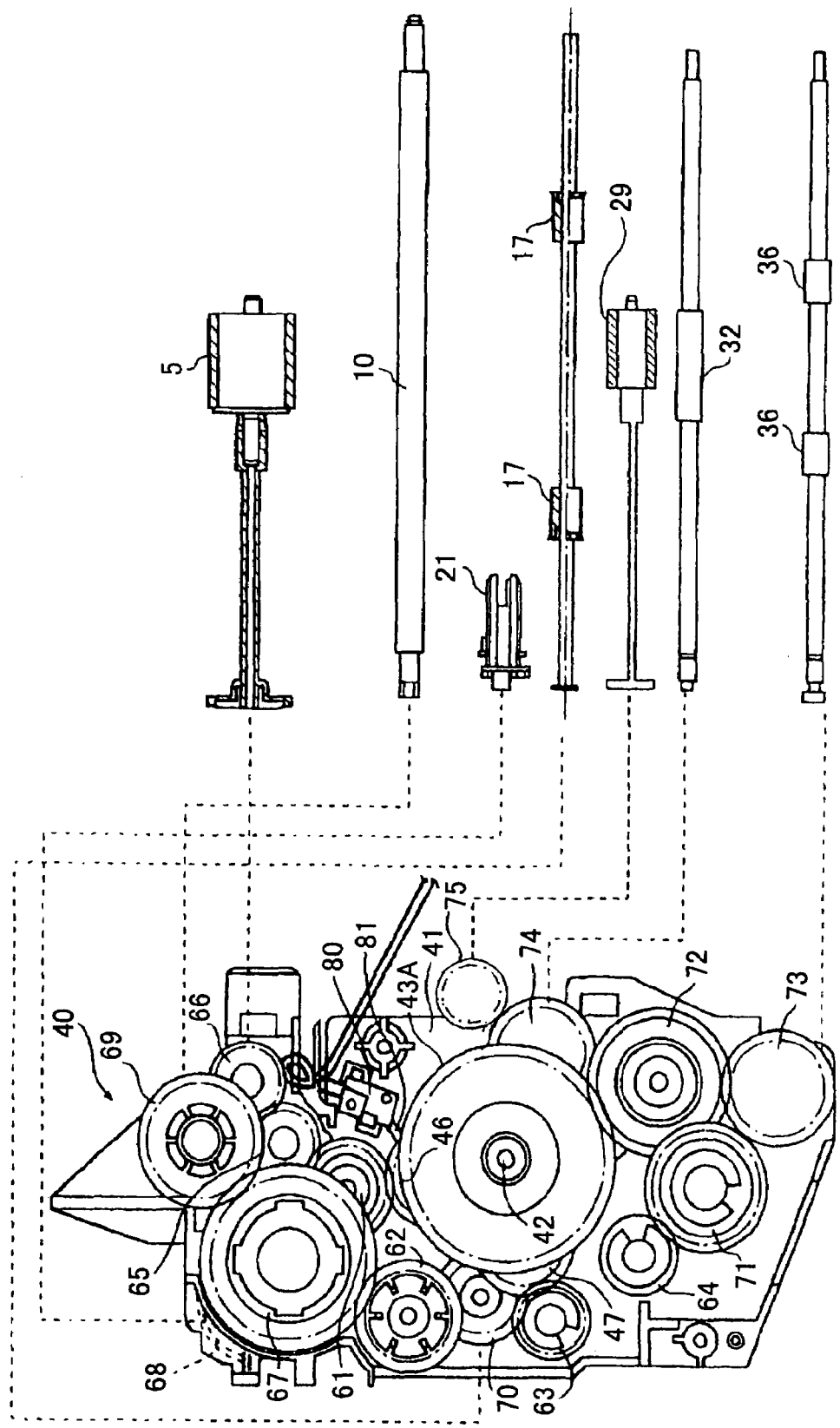
FIG. 3 is an explanatory view of the driving force transmission mechanism according to the embodiment.
Figure 4:
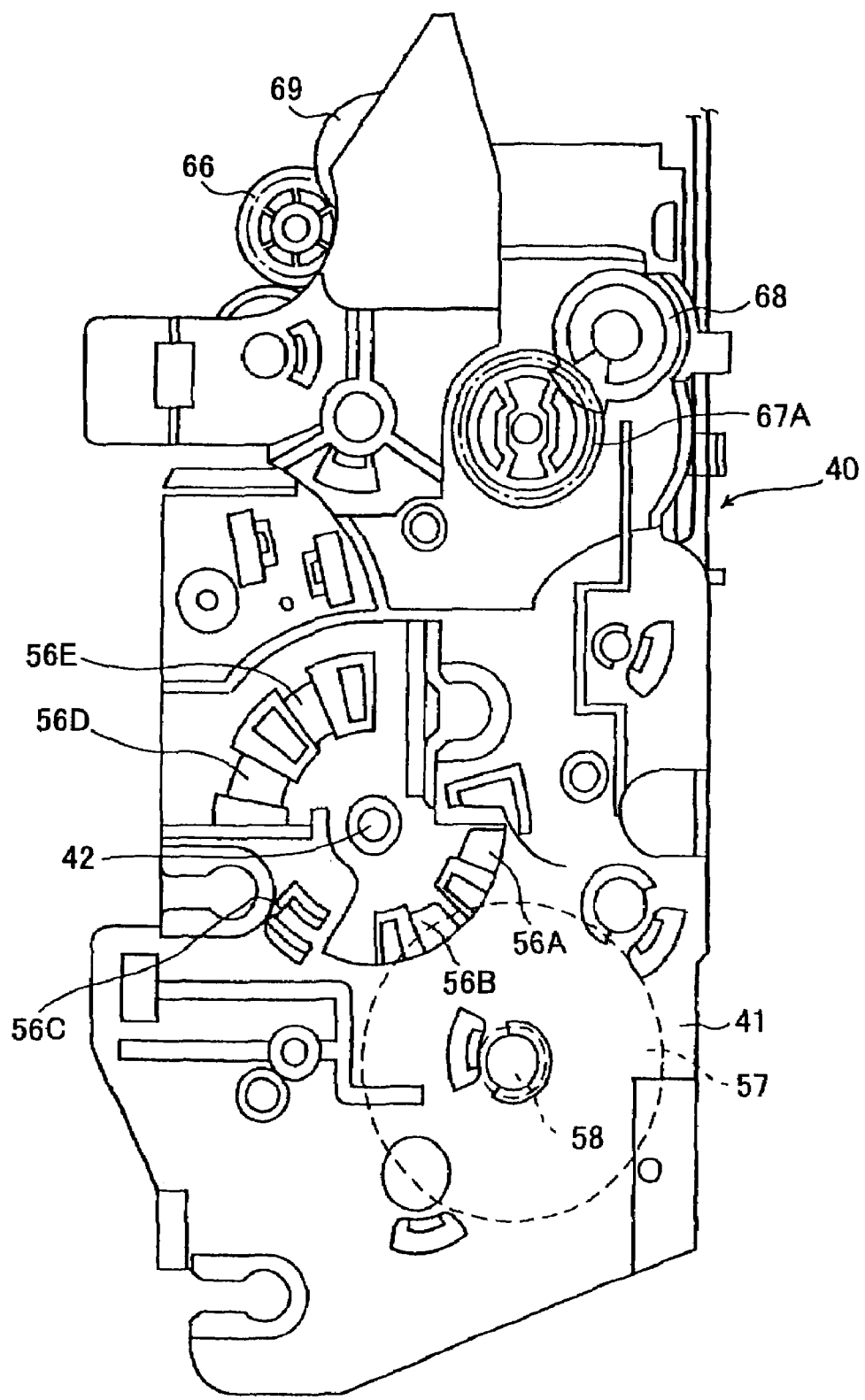
FIG. 4 is a plan view showing a rear side of the driving force transmission mechanism according to the embodiment.
Figure 5:
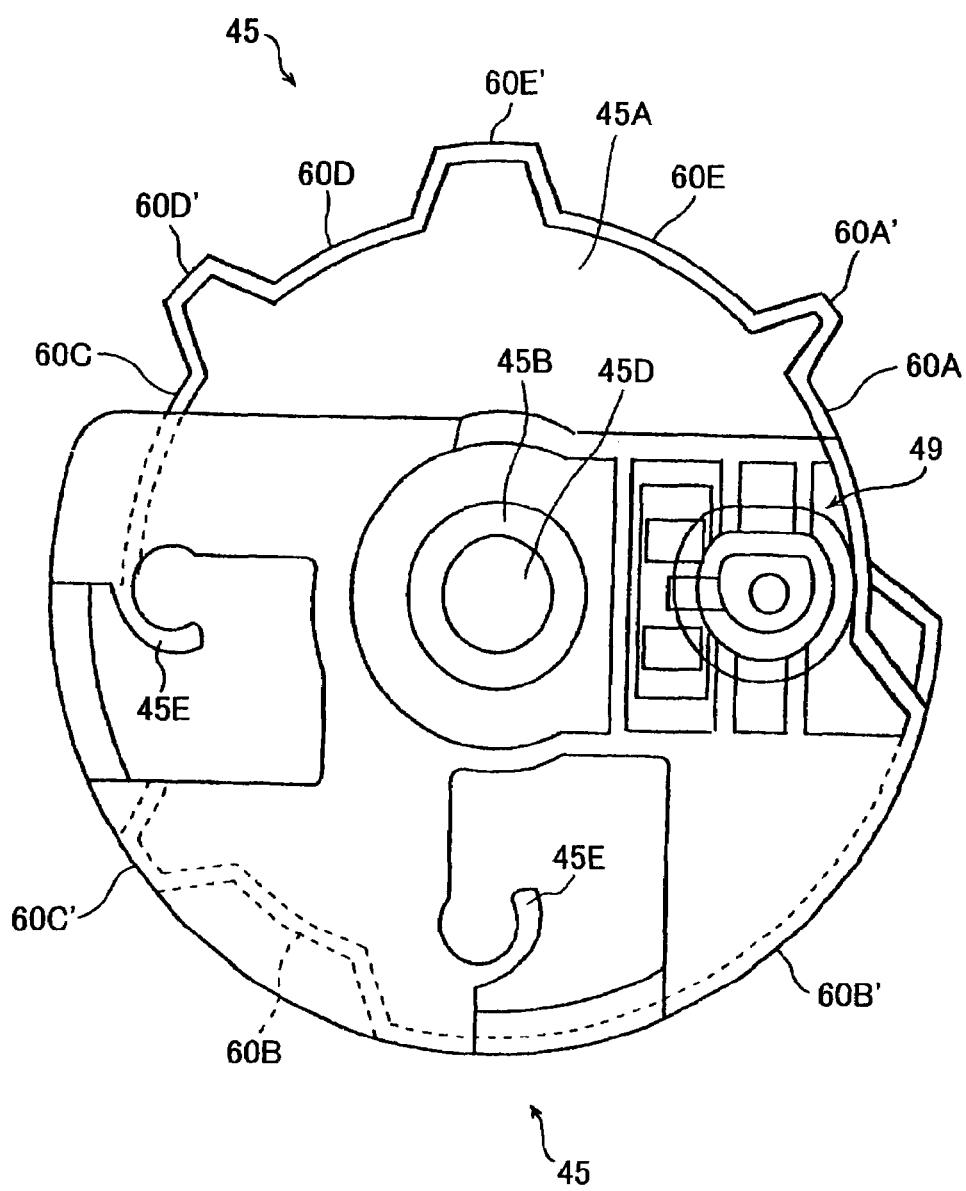
FIG. 5 is a plan view of a rotary member of the driving force transmission mechanism according to the embodiment.
Figure 6:
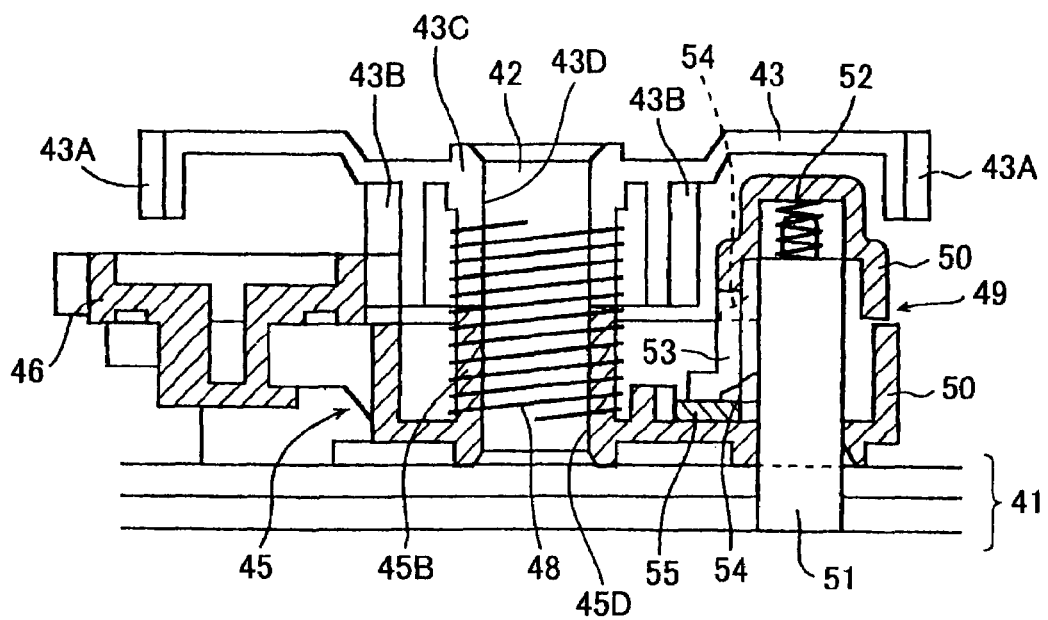
FIG. 6 is a cross-sectional view showing a connection between a sun gear and the rotary member according to the embodiment.

In FIGS. 3 through 6, the driving force transmission mechanism 40 has a base plate 41. A shaft 42 integrally extends from the base plate 41. A sun gear 43 and a rotary member 45 are rotatably supported by the shaft 42 on the base plate 41. The sun gear 43 includes a large diameter gear 43A, a small diameter gear 43B and a cylindrical shaft member 43C those provided integrally with each other. The cylindrical shaft member 43C has a center portion formed with a through-hole 43D. Further, as shown in FIG. 5, the rotary member 45 includes a disc-like member 45A and a cylindrical shaft member 45B. The disc-like member 45A has an outer peripheral portion formed with five recesses 60 and five projections 60'. The cylindrical shaft member 45B has a central portion formed with a through-hole 45D. As shown in FIG. 6, the sun gear 43 and the rotary member 45 are rotatably supported by the base plate 41, with the shaft 42 extending into the through-hole 43D of the cylindrical shaft member 43C and the through-hole 45D of the cylindrical shaft member 45B such that the cylindrical shaft members 43C and 45B are aligned with each other.

As shown in FIG. 6, a clutch spring 48 serving as a one-way clutch is mounted on the cylindrical shaft members 43C and 45B. The clutch spring 48 generates greater torque (tightening torque) when the sun gear 43 is rotated in the counterclockwise direction in FIGS. 3 and 5 (as shown by an arrow B in FIG. 5, and this direction is hereinafter referred to as a forward direction). The tightening torque interconnects the sun gear 43 with the rotary member 45, and rotates the rotary member 45 with the rotation of the sun gear 43. The clutch spring 48 generates smaller torque (loosening torque) when the sun gear 43 is rotated in the clockwise direction in FIGS. 3 and 5 (as shown by an arrow A in FIG. 5, and this direction is hereinafter referred to as a reverse direction). The loosening torque releases the interconnection between the sun gear 43 and the rotary member 45 so as to only allow the sun gear 43 to rotate remaining the rotary member 45 in a non-rotation phase.

In other words, when the sun gear 43 is rotated by the drive motor 57 in the forward direction, greater frictional load arises between the sun gear 43 and the rotary member 45, due to the tightening torque of the clutch spring 48. When the sun gear 43 is rotated by the drive motor 57 in the reverse direction, a frictional load smaller than that arises when the sun gear 43 is rotated in the forward direction, arises between the sun gear 43 and the rotary member 45, due to the loosening torque of the clutch spring 48. More specifically, when the sun gear 43 is rotated by the drive motor 57 in the forward direction, the sun gear 43 and the rotary member 45 rotate together. When the sun gear 43 is rotated by the drive motor 57 in the reverse direction, the sun gear 43 and the rotary member 45 are independently rotatable.

As described later, the rotary member 45 functions as a cam for switching the destination of the driving force of the drive motor 57 to be transmitted through the driving force transmission mechanism 40 according to the operation mode. The clutch spring 48 serves to switch the driving force of the drive motor 57 between the driving force for switching operation mode by the rotary member 45 and the driving force for the gear of a predetermined destination corresponding to the operation mode set by the rotary member 45 (the gear for rotating the sheet feeding roller 5, the platen 10, the sheet discharge roller 17, the document feeding roller 29, the LF roller 32, the ribbon take-up spool 21, the document discharge roller 36, etc.). As stated above, the driving force of the drive motor 57 for rotating the sun gear 43 in the forward direction is the driving force for switching operation mode by the rotary member 45, and the driving force of the drive motor for rotating the sun gear 43 in the reverse direction is the driving force for driving the gear of a predetermined destination corresponding to the operation mode.

As shown in FIG. 5, supporting portions 45E, 45E for rotatably supporting planetary gears 46, 47 are provided at such positions that the supporting portions 45E and 45E form a predetermined angular position with each other (In FIG. 5, a direction of a projection 60E' is defined as a reference direction. The positions of the supporting portions 45E and 45E are located about 90 degrees and about 180 degrees from the reference direction in the counterclockwise direction). Each of the planetary gears 46, 47 are constantly engaged with the smaller diameter gear teeth 43B of the sun gear 43. When the sun gear 43 is rotated in one direction through the drive motor 57, each planetary gear 46, 47 rotates in the same direction. It is to be noted that the sun gear 43 and each planetary gear 46, 47 are not illustrated in FIG. 5 and that only the planetary gear 46 is illustrated in FIG. 6.

Further, a regulating unit 49 is provided at a predetermined radial position on the rotary member 45, which is approximately 270 degrees as measured counterclockwise from the reference direction. As stated above, the rotary member 45 is adapted to be rotated in the forward direction by rotating the sun gear 43 in the forward direction to thereby switch the destination of the driving force of the drive motor according to the operation mode. More specifically, the positions of the two planetary gears 46 and 47 (described later) provided on the rotary member 45 are switched to switch the gears to be engaged with the planetary gears 46 and 47 (the destinations of the driving force).

In this embodiment, there are provided five operation modes: a mode in which the document feeding roller 29, the LF roller 32, and the document discharge roller 36 are rotated in order to read the document (hereinafter referred to as an image reading mode); a mode in which exclusively the sheet feeding roller 5 is rotated in order to feed a recording sheet to the image forming position (hereinafter referred to as a sheet feeding mode); a mode in which the platen 10, the ribbon take-up spool 21, and the sheet discharge roller 17 are rotated in order to form an image on the recording sheet passing the image forming position (hereinafter referred to as a recording mode); a mode in which exclusively the sheet discharge roller 17 is rotated in order to discharge the recording sheet that has completely undergone image formation (hereinafter referred to as a sheet discharge mode); and a mode in which the document feeding roller 29, the LF roller 32, the document discharge roller 36, the platen 10, the ribbon take-up spool 21, and the sheet discharge roller 17 are rotated in order to form an image on the recording sheet based on reading data being read from the document (hereinafter referred to as a copying mode).

There are three modes are provided in respect of the sheet feeding. That is, the sheet feeding mode in which exclusively the recording sheet is fed, the recording mode in which an image is formed on the recording sheet during sheet feeding, and the sheet discharge mode in which the recording sheet that has completely undergone image formation is discharged. This is because, during the sheet feeding period from the sheet stacker 4 to the image forming position and during the sheet feeding period starting from a completion timing of image formation to the completion timing of sheet discharge through the discharge opening, no image forming operation is conducted. Therefore, there is no need to take up the ribbon 20 in synchronism with the feeding of the recording sheet. Thus, for efficient consumption of the ribbon 20, the operation mode is divided into the sheet feeding modes in which exclusively the recording sheet is fed, the sheet discharge mode, and the recording mode in which the recording sheet and the ribbon 20 are fed.

The regulating unit 49 is adapted for positioning the rotary member 45 at respective angular positions each corresponding to each operation mode described above. A structure of the regulating unit 49 will be described below with reference to FIGS. 6 through 8.

The regulating unit 49 includes a cover 50, a rotation regulating member 51 and a pressing spring 52. The rotation member 51 is disposed inside the cover 50 and is movable up and down in the cover 50. The pressing spring 52 is disposed between the upper inner surface of the cover 50 and an upper edge of the rotation regulating member 51 for biasing the rotation regulating member 51 downward. As shown in FIG. 6, a protrusion 54 is formed on a side surface of the rotation regulating member 51. The protrusion 54 is guided upward or downward along a vertical slit 53 formed in the cover 50.

A damper 55 is provided on the upper surface of the rotary member 45 where the damper 55 and the protrusion 54 face each other. When a lower end of the rotation regulating member 51 fits into one of positioning holes 56A, 56B, 56D, 56E (described later) formed in the base plate 41, the protrusion 54 is lowered due to the downward pressing force applied by the pressing spring 52, making the underside of the protrusion 54 contact the rotary member 45. The damper 55 reduces sounds generated at the time the underside of the protrusion 54 abuts the rotary member 45.

The positioning holes 56A, 56B, 56D, 56E, and a positioning edge 56C will be described while referring to FIG. 4. The positioning holes 56A, 56B, 56D, 56E and the positioning edge 56C are formed in the base plate 41 along an arc corresponding to the circumference of the sun gear 43. The rotation regulating member 51 is fitted or engaged in the positioning holes 56A, 56B, 56D, 56E and the positioning edge 56C.

The positioning hole 56A is located at a position for the sheet feeding mode. When the lower end of the rotation regulating member 51 fits into the positioning hole 56A, the rotary member 45 is brought into the sheet feeding mode. As will be described in detail below, a drive force of the drive motor 57 is transmitted to the gear of the sheet pickup roller 5 through the driving force transmission mechanism 40. Then, the sheet pick-up roller 5 rotates.

The positioning hole 56B is located at a position for the recording mode. When the lower end of the rotation regulating member 51 fits into the positioning hole 56B, the rotary member 45 is brought into the recording mode. As will be described below, a driving force of the drive motor 57 is transmitted to those gears of the platen roller 10, the ribbon take-up spool 21, and the sheet discharge roller 17 through the driving force transmission mechanism 40. Then, the platen roller 10, the ribbon take-up spool 21, and the sheet discharge roller 17 are rotated concurrently.

The positioning edge 56C is located at a position for the copying mode. When the lower end of the rotation regulating member 51 contacts the positioning edge 56C, the rotary member 45 is brought into the copying mode. As will be described in detail below, a drive force of the drive motor 57 is transmitted to the document feeding roller 29, the LF roller 32, the document discharge roller 36, the platen roller 10, the ribbon take-up spool 21 and the sheet discharge roller 17 through the driving force transmission mechanism 40. Then, the document feeding roller 29, the LF roller 32, and the document discharge roller 36 rotate for reading an image on a document. At the same time, the platen roller 10, the ribbon take-up spool 21 and the sheet discharge roller 17 rotate for recording the image onto a sheet.

The positioning hole 56D is located at a position for the sheet discharging mode after an image is recorded onto a recording sheet. When the lower end of the rotation regulating member 51 fits into the positioning hole 56D, the rotary member 45 is brought into the sheet discharge mode. As will be described in detail below, a drive force of the drive motor 57 is transmitted to the gear of the sheet discharge roller 17 through the driving force transmission mechanism 40. Then, the sheet discharge roller 17 rotates. The positioning hole 56E is located at a position for the image reading mode. When the lower end of the rotation regulating member 51 fits into the positioning hole 56E, the rotary member 45 is brought into the image reading mode. As will be described in detail below, a drive force of the drive motor 57 is transmitted to those gears of the document feeding roller 29, the LF roller 32, and the document discharge roller 36 through the driving force transmission mechanism 40. Then, the document feeding roller 29, the LF roller 32, and the document discharge roller 36 rotate.

In this way, the positioning holes 56A, 56B, 56D, 56E and the positioning edge 56C are disposed along the arc corresponding to the circumference of the sun gear 43 to cyclically set the rotary member 45 into the sheet feeding mode, the recording mode, the copying mode, the sheet discharging made, and the image reading mode in this order. Such arrangements enable the various modes of the facsimile device 1 to be performed consecutively, with a minimum rotation of the sun gear 43.

That is, the rotary member 45 is constructed so as to rotate exclusively in the forward direction to switchingly provide one of the five operation modes. Further, as described above, when forming an image on a recording sheet, there are conducted a series of sheet feeding operations: the feeding of the recording sheet, the image formation on the recording sheet, and the discharge of the recording sheet, so that the rotary member 45 effects switching of the operation modes in the order: the sheet feeding mode, the recording mode, and the sheet discharge mode. At this time, the operation modes are arranged in the order of the sheet feeding mode, the recording mode, and the sheet discharge mode, so that an image can be formed on the recording sheet through a minimum rotation of the sun gear 43. Further, in the copying mode, there is a time lag between the document reading operation and the operation of forming an image on the recording sheet, and the discharge of the recording sheet is finally effected after the completion of the image formation on the recording sheet. Accordingly, the copying mode position is provided between the recording mode position and the sheet discharge mode position. Further, in the image reading mode the reading of the document is exclusively conducted at the time of facsimile transmission, and no image forming operation is conducted on the recording sheet. Thus, the image reading mode is arranged after the sheet discharge mode.

Figure 10:
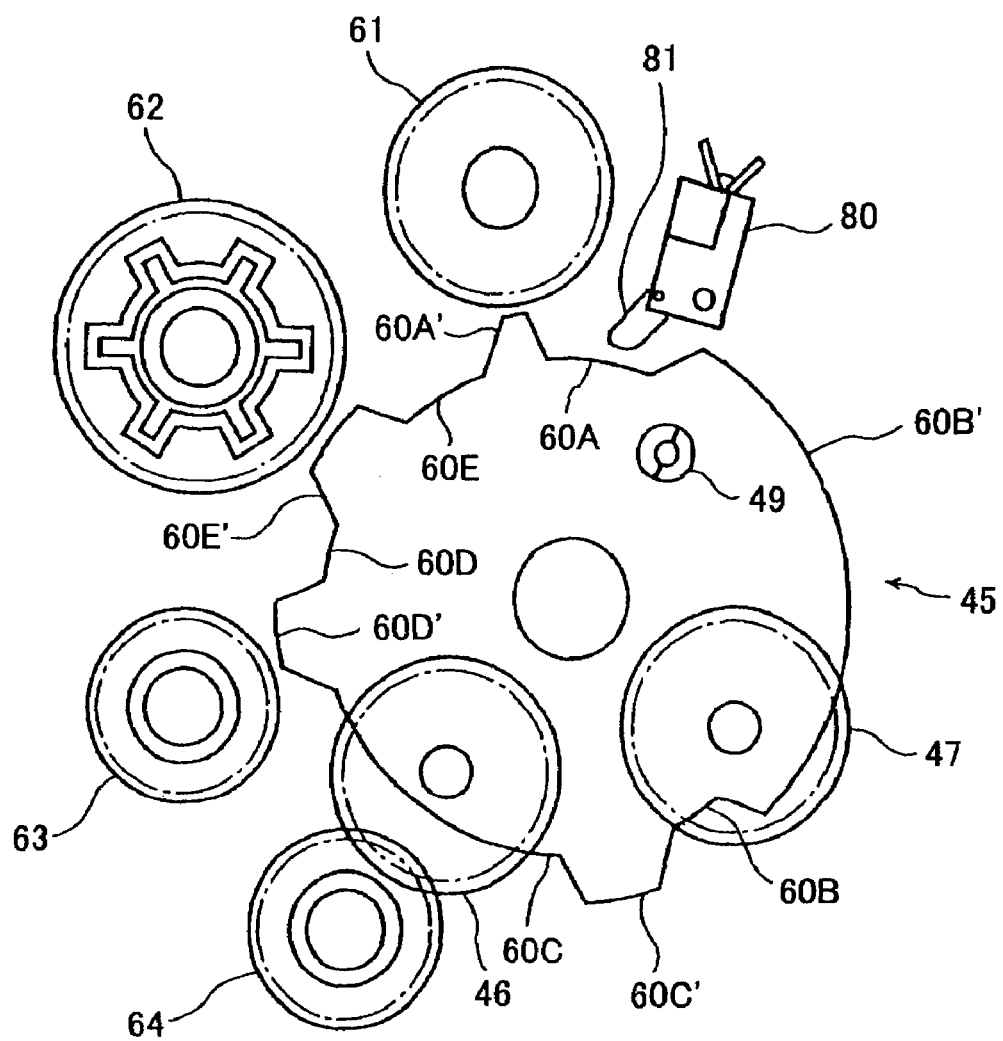
FIG. 10 is an explanatory view showing an essential portion of the driving force transmission mechanism during image reading phase on a document according to the embodiment.

In the standby state, the rotary member 45 is set to the image reading mode position. As shown in FIG. 10, this is done for the purpose of restraining a play or rattling in the rotary member 45 by engaging the planetary gear 46 with the transmission gear 64, and further for the purpose of making it possible to quickly start image formation on the recording sheet based on reception data upon facsimile reception, the device being normally on standby for facsimile reception.

As shown in FIG. 4, the drive motor 57 (pulse motor) is disposed adjacent to the sun gear 43 on a front side of the base plate 41. A pinion 58 is mounted on a drive shaft of the drive motor 57. The pinion 58 engages with the large diameter gear 43A of the sun gear 43 on the front side of the base plate 41.

Figure 7:
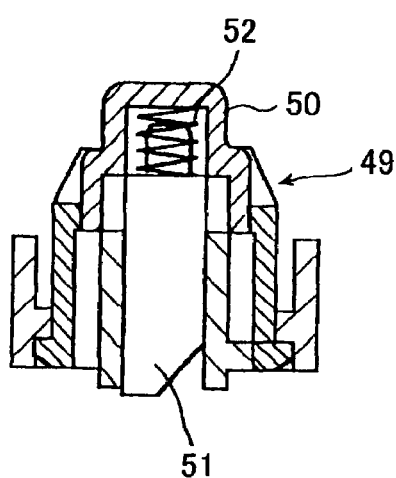
FIG. 7 is a cross-sectional view showing a rotation regulating unit of the rotary member according to the embodiment.
Figure 8:
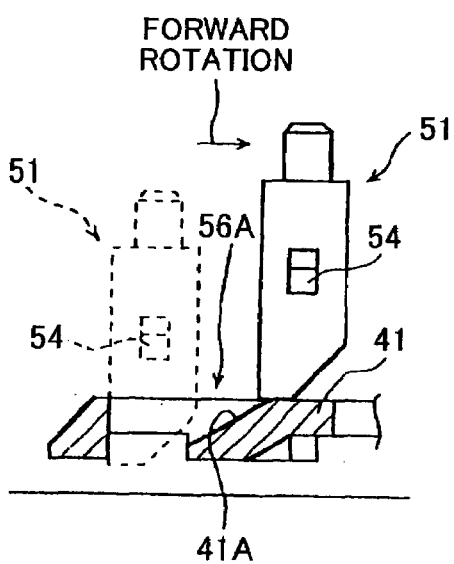
FIG. 8 is an explanatory view showing actions of a rotation regulating member of the regulating unit according to the embodiment.

With reference to FIGS. 6 through 8, described will be the fit of the rotation regulating member 51 into the positioning holes 56A, 56B, 56D, 56E or with the positioning edge 56C when the rotary member 45 is rotated in the forward direction by the action of the clutch spring 48 as the sun gear 43 rotates in the forward direction. FIG. 8 only illustrates the positioning hole 56A as an example, however, substantially the same principle can be applied to other positioning holes 56B, 56D, 56E, and the positioning edge 56C.

As the sun gear 43 rotates in the forward direction, greater frictional load is generated between the sun gear 43 and the rotary member 45 with the action of the clutch spring 48. Consequently, the rotary member 45 starts to rotate in the same direction as the sun gear 43. When the rotation regulating member 51 does not fit into the positioning hole 56A, 56B, 56D, 56E, nor contact the positioning edge 56C, the lower end of the rotation regulating member 51 contacts the upper surface of the base plate 41. In this state, the lower end of the rotation regulating member 51 is located at a position indicated by a dotted line in FIG. 6 or a solid line in FIG. 8. The pressing spring 52 is held under compression.

As the rotary member 45 is further rotated, the lower end of the rotation regulating member 51 is eventually fits in the positioning hole 56A, 56B, 56D, 56E, or contacts the positioning edge 56C, as shown by solid line in FIG. 6 and dotted line in FIG. 8. As the sun gear 43 is rotated in the reverse direction in the state that the lower end of the rotation regulating member 51 engages in the positioning hole 56A, 56B, 56D, 56E, or contacts the positioning edge 56C, according to the rotation of the drive motor 57 and the pinion 58. The frictional load applied between the sun gear 43 and the rotary member 45 is decreased by the action of the clutch spring 48. Accordingly, the rotating force of the rotary member 45 in the reverse direction following the rotation of the sun gear 43 becomes insignificant, or very small. In addition, the regulating unit 49 regulates the rotation of the rotary member 45, so that the rotary member 45 does not rotate together with the sun gear 43 in the reverse direction, but stops rotating at the positioning hole 56A, 56B, 56D, 56E, or the positioning edge 56C.

Because each planetary gear 46, 47 is constantly engaged with the smaller diameter gear 43B of the sun gear 43, each planetary gear 46, 47 rotates in the same direction about each axis, as the sun gear 43 rotates in the reverse direction. In this state, the frictional load applied between the sun gear 43 and the rotary member 45 is decreased and the rotary member 45 is positioned by the regulating unit 49. Consequently, the drive force of the drive motor 57 is efficiently transmitted to transmission gears (described later), through the sun gear 43 and the planetary gears 46, 47. Therefore, a motor that provides a relatively small drive force can be used.

As the sun gear 43 is rotated again in the forward direction after being rotated in the reverse direction, the greater frictional load is applied between the sun gear 43 and the rotary member 45, due to the action of the clutch spring 48. Accordingly, the rotary member 45 is again rotated in the forward direction along with the sun gear 43 rotating in the forward direction. Thus, the planetary gears 46, 47 are again orbitally moved about the sun gear 43. At this time, as shown by a solid line in FIG. 8 the lower end of the rotation regulating member 51 is guided upwardly along a tilt 41A formed in the base plate 41 and at a position immediately downstream of the positioning holes 56A, 56B, 56D, 56E, and the positioning edge 56C in the forward rotating direction of the rotary member 45. Then, the lower end of the rotation regulating member 51 comes into contact with the upper surface of the base plate 41.

The rotation regulating member 51 can be disengaged from the positioning holes 56A, 56B, 56D, 56E or the positioning edge 56C only in one direction. Therefore, the rotary member 45 is continuously rotatable only in the same direction as the sun gear 43 rotating in the forward direction. As the sun gear 43 starts to rotate in the reverse direction, the rotary member 45 follows the reverse rotation of the sun gear 43 and is slightly rotated in the reverse direction.

Turning back to FIG. 5, five recesses 60A, 60B, 60C, 60D, 60E having a depth in the diametrical direction of the rotary member 45 and five projections 60A', 60B', 60C', 60D', 60E' having a height in the diametrical direction of the rotary member 45 are alternately and integrally formed in the outer periphery of the rotary member 45. Each recess 60A, 60B, 60C, 60D, 60 and each projection 60A', 60B', 60C', 60D', 60E' has a length different from each other along the circumferential direction of the rotary member 45.

In this embodiment, the recess 60A, 60B, 60C, 60D, 60E and the projection 60A', 60B', 60C', 60D', 60E' adjacent to each other are paired, so that a total of five pairs are provided to correspond to the above-described five modes of facsimile device 1, that is, the sheet feeding mode, the recording mode, the copying mode, the sheet discharging mode, and the image reading mode. While the rotary member 45 is rotating, the projections 60A', 60B', 60C', 60D', 60E' come into contact with or out of contact from a switch terminal 81 of a sensor switch 80 (in FIG. 3), so that a detection signal output from the sensor switch 80 is represented as ON or OFF signal. Accordingly, the operation mode of the rotary member 45 can be detected by the ON/OFF signals.

The signal output from the sensor switch 80 is input into a microcomputer described later. When the switch terminal 81 of the sensor switch 80 contacts the projection 60A', 60B', 60C', 60D', 60E' of the rotary member 45, the ON signal is output from the sensor switch 80. When the switch terminal 81 becomes out of contact from the projection 60A', 60B', 60C', 60D', 60E' and is brought into the recess 60A, 60B, 60C, 60D, 60E, the OFF signal is output from the sensor switch 80. Alternatively, when the switch terminal 81 contacts the projection 60A', 60B', 60C', 60D', 60E', the OFF signal can be output from the sensor switch 80. When the switch terminal 81 is in the recess 60A, 60B, 60C, 60D, 60E, the ON signal can be output from the sensor switch 80.

Transmission of the drive force through the driving force transmission mechanism 40 to the sheet pick-up roller 5, the platen roller 10, the ribbon take-up spool 21, the sheet discharge roller 17, the LF roller 32, and the document discharge roller 36 will be described with reference to FIG. 3.

In FIG. 3, four transmission gears of a first transmission gear 61, a second transmission gear 62, a third transmission gear 63, and a fourth transmission gear 64 are provided so as to be rotatably supported on the base plate 41, along an orbital path of the planetary gears 46, 47 that orbitally rotate when the rotary member 45 rotates in the forward direction. The transmission gears 61 through 64 are successively engaged with the planetary gears 46, 47 at a position where the rotary member 45 is stopped by the rotation regulating member 51 upon fitting in the positioning holes 56A, 56B, 56D, 56E or upon contacting the positioning edge 56C. The transmission gear 61 through 64 is rotated as the planetary gears 46, 47 rotate on their axes in association with the rotation of the sun gear 43.

The first transmission gear 61 is engaged with a driven gear 65, which is engaged with another driven gear 66. The driven gear 66 is connected to the sheet pick-up roller 5 through a gear train. As the lower end of the rotation regulating member 51 fits in the positioning hole 56A while the rotary member 45 is rotating, the planetary gear 47 and the first transmission gear 61 are engaged with each other. Thus, a drive force transmission path from the sun gear 43 to the sheet pick-up roller 5 is formed with the planetary gear 47, the first transmission gear 61, and the driven gears 65, 66. Accordingly, the sheet pick-up roller 5 is driven, as the sun gear 43 is rotated in the reverse direction with the lower end of the rotation regulating member 51 fitted in the positioning hole 56A. The driving force transmission mechanism 40 is brought into the sheet feeding mode which transmit a drive force of the drive motor 57 to the sheet pick-up roller 5.

The second transmission gear 62 is engaged with a driven gear 67 which has a driven gear 67A (FIG. 4) integrally formed with the driven gear 67 at a lower side. The driven gear 67A is engaged with another driven gear 68, which is supported on the backside of the base plate 41, as shown in FIG. 4. The driven gear 68 is connected to the ribbon take-up spool 21 through a gear train. As the lower end of the rotation regulating member 51 fits in the positioning hole 56B while the rotary member 45 is rotating, the planetary gear 47 and the second transmission 62 are engaged with each other. Thus, a drive force transmission path from the sun gear 43 to the ribbon take-up spool 21 is formed with the planetary gear 47, the second transmission 62, and the driven gears 67, 67A, 68.

The driven gear 67 is also engaged with a driven gear 69 as shown in FIG. 3. The driven gear 69 is connected to the platen roller 10 through a gear train. Similarly, a drive force transmission path from the sun gear 43 to the platen roller 10 is formed with the planetary gear 47, the second transmission gear 62, and the driven gears 67, 69, when the lower end of the rotation regulating member 51 fits in the positioning hole 56B.

Disposed below the second transmission gear 62 is a driven gear (not shown) that engages with another driven gear 70 (FIG. 3). The driven gear 70 is connected to the sheet discharge roller 17 through a gear train. Similarly, a drive force transmission path from the sun gear 43 to the sheet discharge roller 17 is formed with the planetary gear 47, the second transmission gear 62, the driven gear (not shown) disposed below the second transmission gear 62, and the driven gear 70, when the lower end of the rotation regulating member 51 fits in the positioning hole 56B. The driven gear 70 is engaged with the third transmission gear 63, and accordingly, the third transmission gear 63 is rotated. However, the third transmission gear 63 does not transmit the drive force to the other gears.

As the sun gear 43 is rotated in the reverse direction with the lower end of the rotation regulating member 51 fitted in the positioning hole 56B, the driving force transmission mechanism 40 is brought into the recording mode which transmit a drive force of the drive motor 57 to the ribbon take-up spool 21, the platen roller 10, and the sheet discharge roller 17.

The third transmission gear 63 is engaged with the driven gear 70, as described above. The fourth transmission gear 64 is engaged with a driven gear 71. Disposed below the driven gear 71 is a driven gear (not shown) which is integrally formed with the driven gear 71. The driven gear (not shown) disposed below the driven gear 71 is engaged with a driven gear 72 that is also engaged with another driven gear 73. The driven gear 73 is connected to the document discharge roller 36 though a gear train. A driven gear (not shown) disposed below the driven gear 72 is engaged with another driven gear 74. The driven gear 74 is connected to the LF roller 32 through a gear train.

As the lower end of the rotation regulating member 51 contacts the positioning edge 56C while the rotary member 45 is rotating, the planetary gear 47 engages with the fourth transmission gear 64 and the planetary gear 46 engages with the second transmission gear 62. In this state, two transmission gears 62, 64 are selected at the same time. When the lower end of the rotation regulating member 51 contacts the positioning edge 56C, a drive force transmission path from the sun gear 43 to the document discharge roller 36 is formed with the planetary gear 47, the fourth transmission gear 64, the driven gear 71, the driven gear (not shown) disposed below the driven gear 71, and the driven gear 73. At the same time, a drive force transmission path from the sun gear 43 to the LF roller 32 is formed with the planetary gear 47, the fourth transmission gear 64, the driven gear 71, the driven gear (not shown) disposed below the driven gear 71, the driven gear 72, the driven gear (not shown) below the driven gear 72, and the driven gear 74.

Because the planetary gear 46 is engaged with the second transmission gear 62, the drive force transmission path from the sun gear 43 to the ribbon take-up spool 21 is formed with the second transmission gear 62, the driven gear 67, the driven gear 67A disposed below the driven gear 67, and the driven gear 68. The drive force transmission path from the sun gear 43 to the platen roller 10 is formed with the second transmission gear 62, and the driven gears 67, 69, and the drive force transmission path from the sun gear 43 to the sheet discharge roller 17 is formed with the second transmission gear 62, the driven gear (not shown) disposed below the second transmission gear 62, and the driven gear 70, as described above.

Accordingly, as the sun gear 43 is rotated in the reverse direction with the lower end of the rotation regulating member 51 contacting the positioning edge 56C, the driving force transmission mechanism 40 is brought into the copying mode for transmitting the drive force of the drive motor 57 to the document feeding roller 29, the LF roller 32, the document discharge roller 36, the ribbon take-up spool 21, the platen roller 10, and the sheet discharge roller 17.

As the lower end of the rotation regulating member 51 fits the positioning hole 56D while the rotary member 45 is rotating, the planetary gear 46 and the third transmission 63 are engaged with each other. Thus, a drive force transmission path from the sun gear 43 to the sheet discharge roller 17 is formed with the planetary gear 46, the third transmission 63, and the driven gear 70. At this time, the planetary gear 47 idly rotates without engaging any transmission gears 61 through 64. The driven gear 70 and the driven gear disposed below the second transmission gear 62 are engaged with each other. However, due to the action of a clutch spring (not shown) mounted on the second transmission gear 62 and the driven gear disposed below the gear 62, the second transmission gear 62 and the driven gear below the gear 62 are disconnected. Therefore, the rotation of the driven gear 70 is not transmitted to the second transmission gear 62.

Accordingly, as the sun gear 43 is rotated in the reverse direction with the lower end of the rotation regulation member 51 fitting the positioning hole 56D, the driving force transmission mechanism 40 is brought into the sheet discharge mode which transmits a drive force of the drive motor 57 to the sheet discharge roller 17.

When the sheet discharge roller 17 is rotated by the drive force transmitted through the drive force transmission path formed as described above in the sheet discharge mode, the second transmission gear 62 is not rotated. Therefore, the drive force transmission path formed with the second transmission gear 62 and the driven gears 67, 68 is disconnected. Consequently, the ribbon take-up spool 21 is not driven while the recording sheet is discharged. Thus, a waste of the ribbon 20 is prevented.

Figure 18:
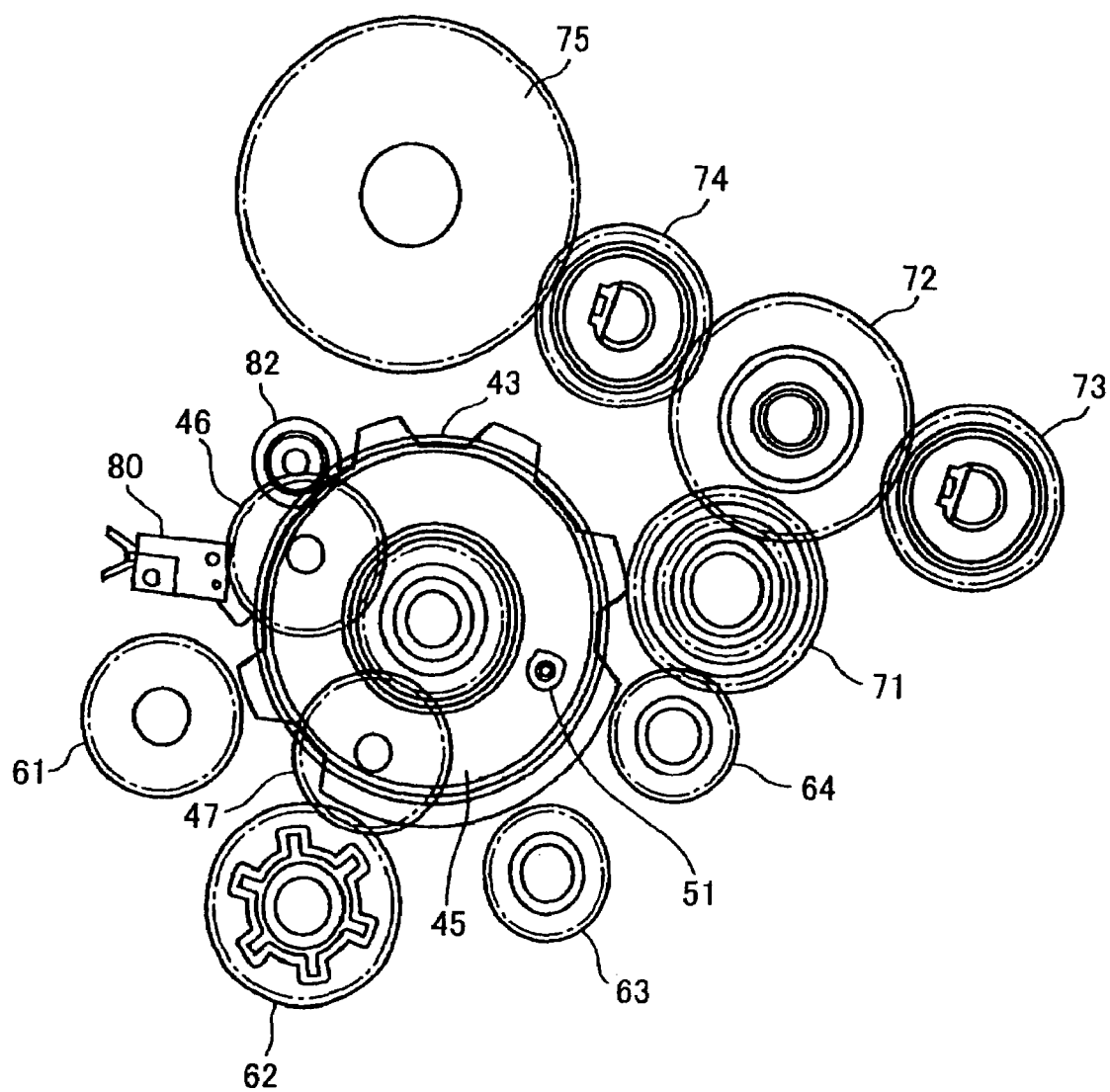
FIG. 18 is an explanatory diagram showing a driving force transmission mechanism in a recording mode according to the embodiment.

As the lower end of the rotation regulating member 51 fits in the positioning hole 56E while the rotary member 45 is rotating, the planetary gear 46 and the fourth transmission 64 are engaged with each other. Thus, the drive force transmission path from the sun gear 43 to the document discharge roller 36 is formed with the planetary gear 46, the fourth transmission 64, the driven gear 71, the driven gear disposed below the driven gear 71, and driven gears 72, 73. At the same time, the drive force transmission path from the sun gear 43 to the LF roller 32 is formed with the planetary gear 46, the fourth transmission gear 64, the driven gear 71, the driven gear disposed below the driven gear 71, the driven gear 72, and a driven gear 74. The drive force transmission path from the sun gear 43 to the document feeding roller 29 is formed with the planetary gear 46, the fourth transmission gear 64, the driven gear 71, the driven gear disposed below the driven gear 71, and the driven gears 72, 74, 75 (the gear 75 is shown in FIG. 18). At this time, the planetary gear 47 does not engage with any other gear.

Accordingly, the document feeding roller 29, the LF roller 32, and the document discharge roller 36 are driven, as the sun gear 43 is rotated in the reverse direction when the lower end of the rotation regulation member 51 is fitted in the positioning hole 56E.

When, in association with the rotation of the sun gear 43 in the forward direction, the rotary member 45 rotates at a position that any of the transmission gears 61 through 64 is rotated, the planetary gears 46, 47 need to be orbitally rotated so as to pass across any of the irrelevant transmission gears 61 through 64 for desired modes and to engage with the desired one of the transmission gears 61 through 64. This requires a large amount of drive force, and great frictional load between the sun gear 43 and the rotary member 45, which is obtained using the tightening torque of the clutch spring 48.

On the other hand, when the rotary member 45 does not need to rotate in association with the reverse rotation of the sun gear 43, the frictional load between the rotary member 45 and the sun gear 43 is reduced using the loosening torque of the clutch spring 48, to rotate the planetary gears 46, 47 on their axes. While the sun gear 43 rotates in the reverse direction, the rotary member 45 is positioned by the regulating unit 49 and stopped, and the rotation of the sun gear 43 is transmitted to the planetary gears 46, 47. By means of the clutch spring 48 interposed between the sun gear 43 and the rotary member 45, the frictional load applied between the sun gear 43 and the rotary member 45 can be changed according to the rotating directions of the sun gear 43.

Figure 9:
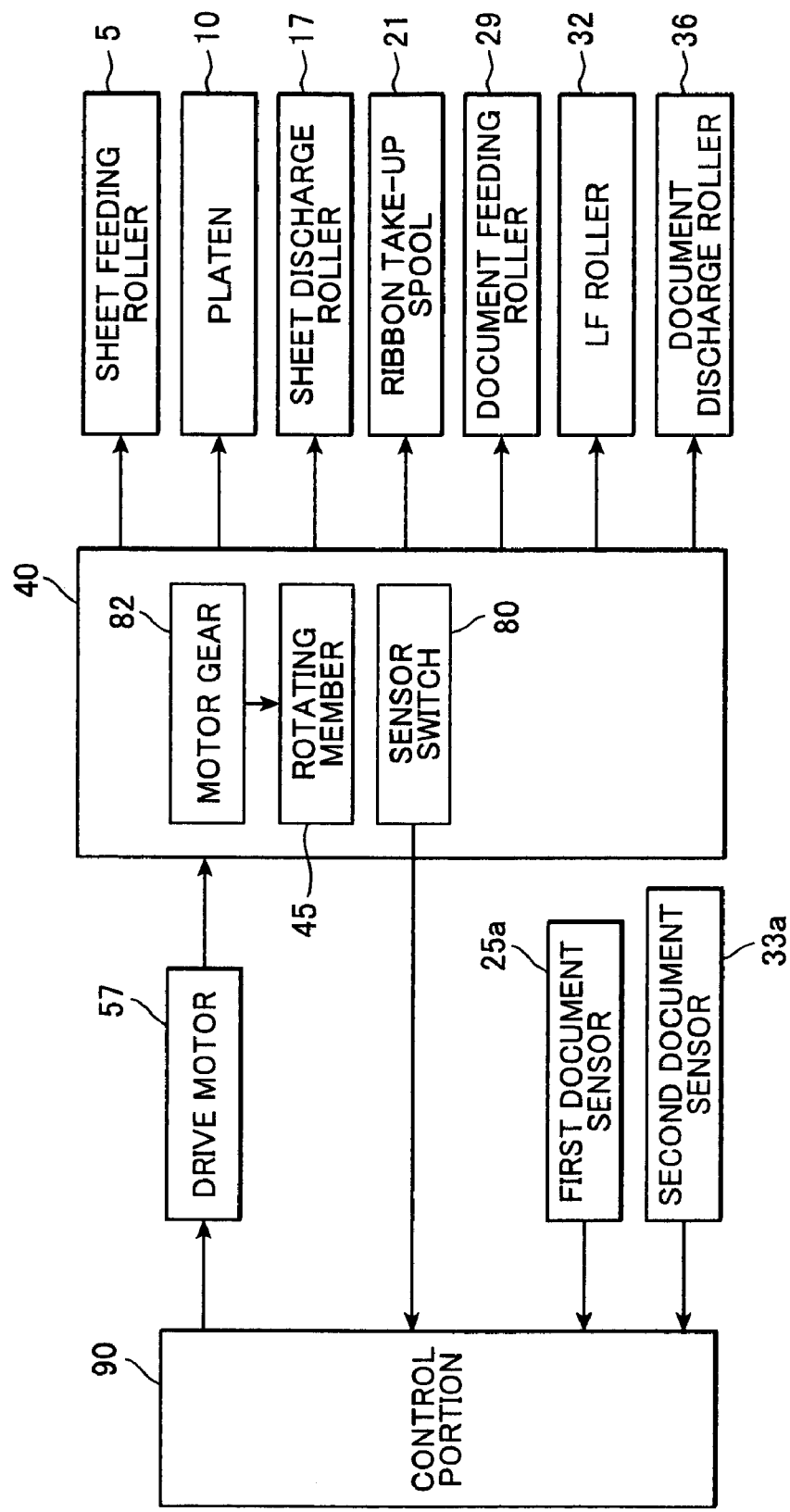
FIG. 9 is a block diagram showing a control arrangement of the facsimile device according to the embodiment.

FIG. 9 is a block diagram showing a control arrangement of a facsimile device according to this embodiment. In the drawing, the facsimile device 1 has a control portion 90, to which the drive motor 57, the sensor switch 80, the first document sensor 25a, and the second document sensor 33a are connected.

The control portion 90 serves to control the operation of the entire device including the driving force transmission mechanism 40, and is formed of, for example, a one-chip microcomputer. As is well known, a microcomputer of this type operates based on a program stored in a ROM and data stored in a RAM, using a CPU as a central processor. Thus, a description of the general construction of the microcomputer of the facsimile device 1 will be omitted.

Further, in this embodiment, there is stored in the RAM an operation flag indicating whether each operation in the facsimile device 1 has been normally conducted or not. Here, when the operation flag is "0" on the standby mode, it indicates that the operation before the standby has been conducted normally. When the operation flag is "1" on the standby mode, it indicates that some abnormality has been generated during the operation before the standby Connected to the drive motor 57 is the motor gear 82 of the driving force transmission mechanism 40 including the rotary member 45. Further, the sheet feeding roller 5, the platen 10, the sheet discharge roller 17, the ribbon take-up spool 21, the document feeding roller 29, the LF roller 32, and the document discharge roller 36 are connected to the driving force transmission mechanism 40 according to the operation mode as described above.

Referring to FIGS. 10 through 15, operations of the driving force transmission mechanism 40 that switches the drive force transmission paths will be described below in association with the basic three operation modes of the facsimile device 1, that is, a transmission pattern, a reception pattern, and a copying pattern.

In the transmission pattern, the image reading operation for reading an image on a document is performed with the CIS unit 34 by rotating the LF roller 32 and the document discharge roller 36, and a data transmitting operation for transmitting the read image data to another facsimile device is performed. In the reception pattern, an image recording operation and a sheet discharging operation are performed. More specifically, the recording sheet is first fed using the sheet pick-up roller 5. Thereafter, the platen roller 10 and the sheet discharge roller 17 are rotated while the ribbon 20 is fed using the ribbon take-up spool 21, to record image data received from another facsimile device onto a recording sheet with the thermal head 11. Then, the recording sheet is discharged from the facsimile device 1. In the copying pattern, the image reading operation, which is performed in the transmission pattern and the image recording operation, which is performed in the reception pattern, are performed at the same time.

Figure 11:
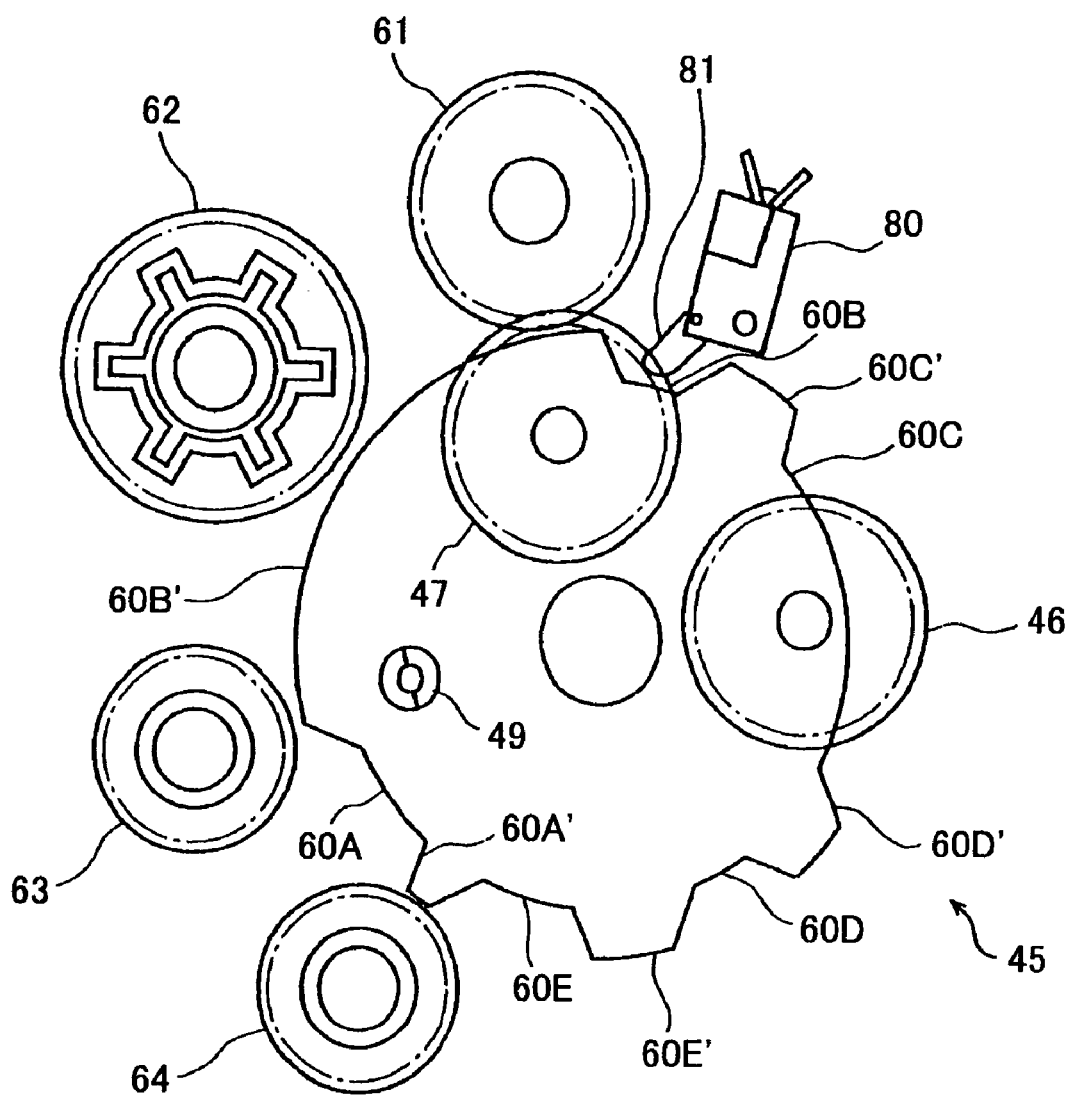
FIG. 11 is an explanatory view showing an essential portion of the driving force transmission mechanism during supplying phase of the recording sheet according to the embodiment.
Figure 12:
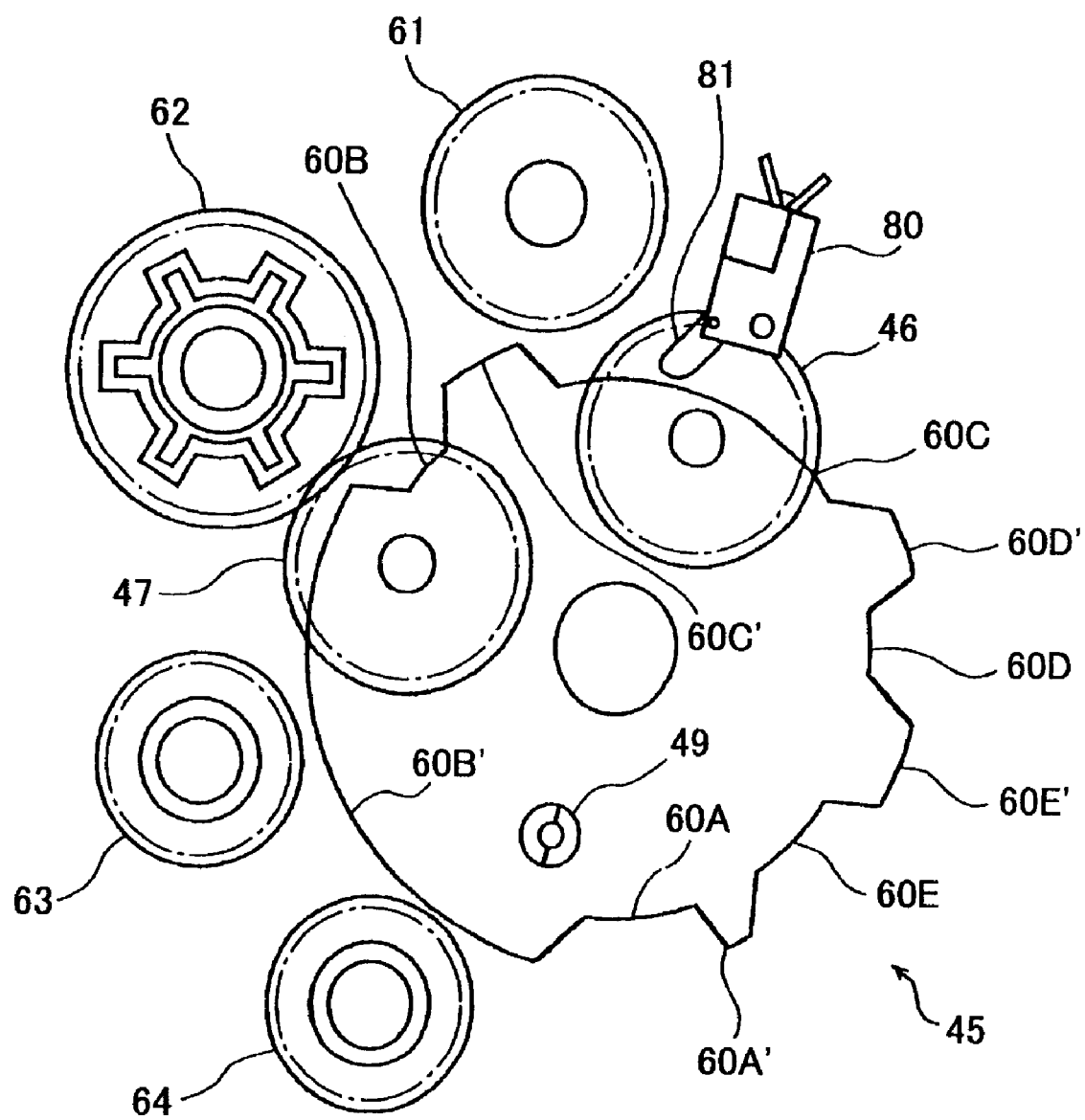
FIG. 12 is an explanatory view showing an essential portion of the driving force transmission mechanism during image recording phase on the recording sheet according to the embodiment.
Figure 13:
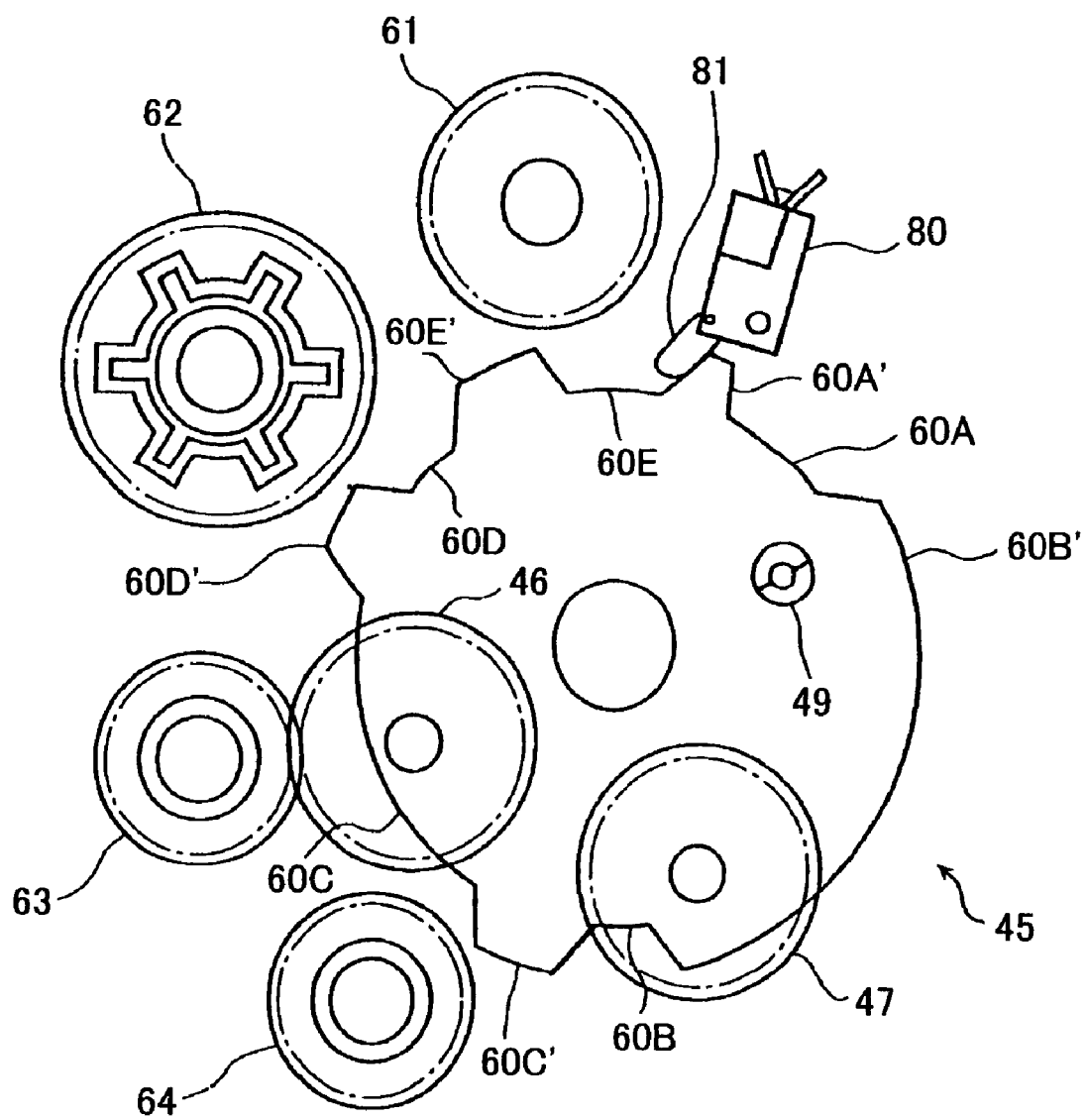
FIG. 13 is an explanatory view showing an essential portion of the driving force transmission mechanism during recording sheet discharge phase according to the embodiment.
Figure 14:
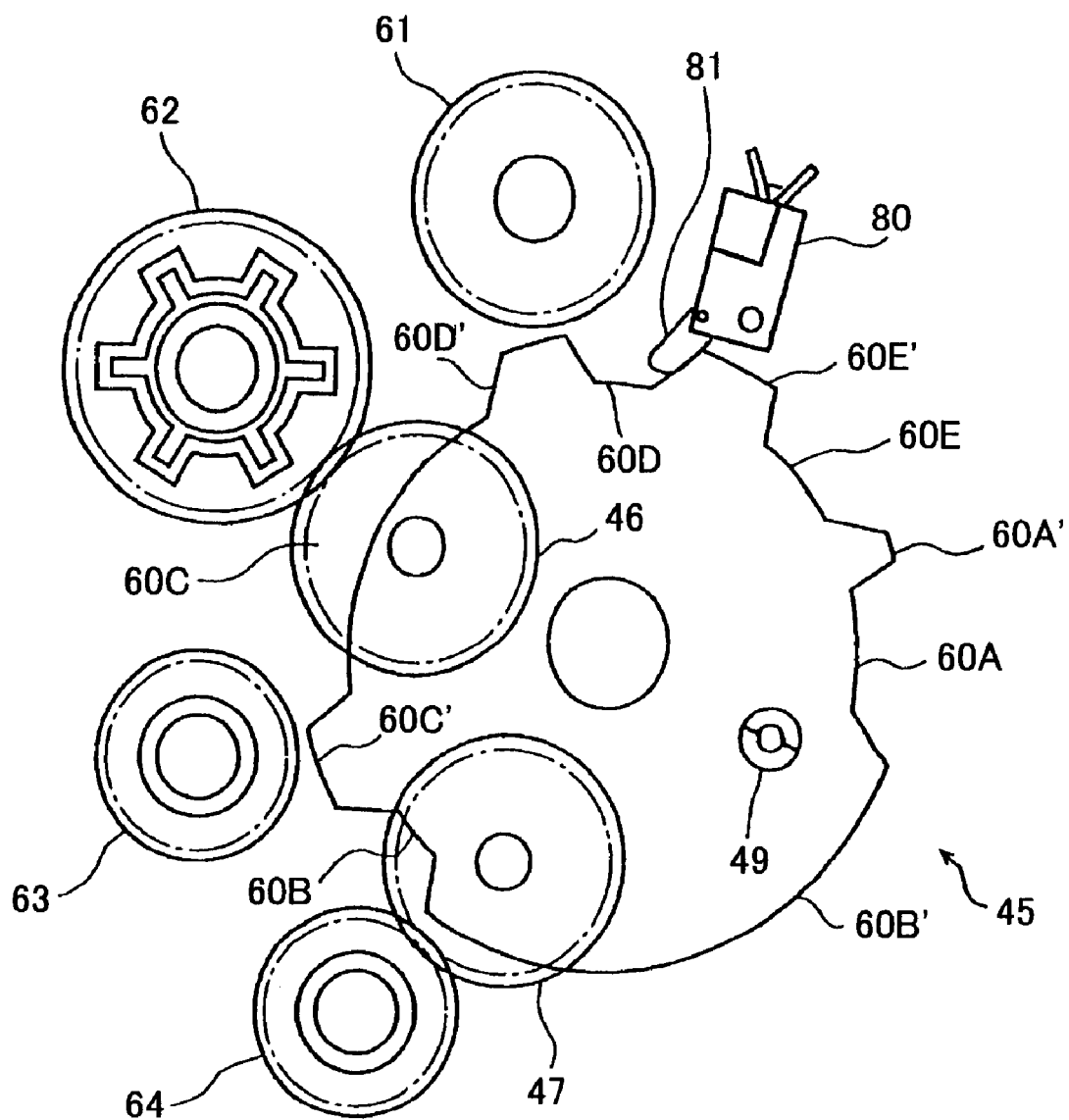
FIG. 14 is an explanatory view of showing an essential portion of the driving force transmission mechanism when reading of the image on the document and recording onto the recording sheet are performed simultaneously according to the embodiment.
Figure 15:
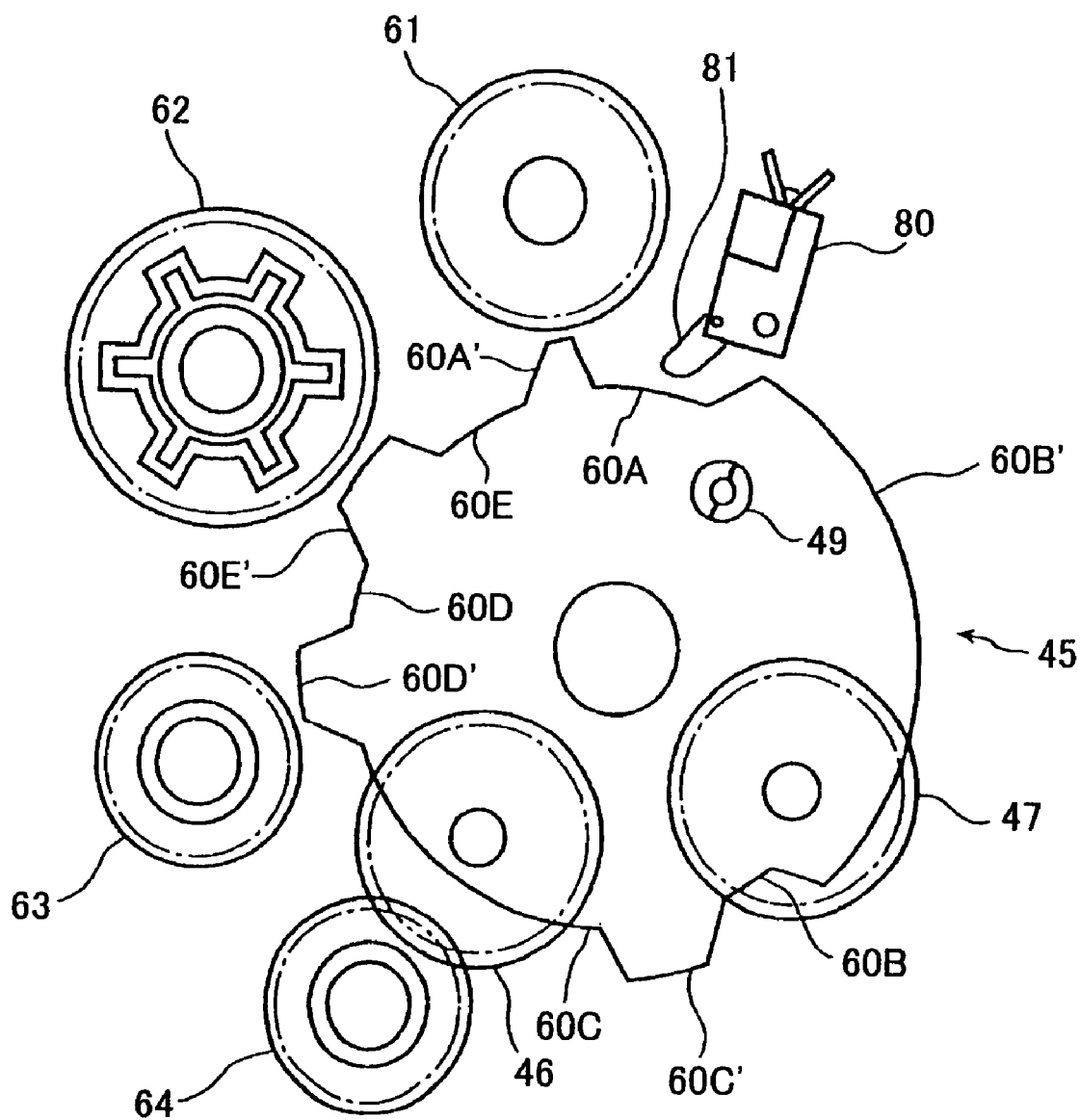
FIG. 15 is an explanatory view of showing an essential portion of the driving force transmission mechanism during standby phase of the facsimile device according to the embodiment.

FIG. 10 shows a principal portion of the driving force transmission mechanism 40 when an image on a document is read. FIG. 11 shows the principal portion of driving force transmission mechanism 40 when a recording sheet is fed. FIG. 12 shows the principal portion of the driving force transmission mechanism 40 when recording is performed onto the recording sheet. FIG. 13 shows the principal portion of the driving force transmission mechanism 40 when the recording sheet is discharged. FIG. 14 shows the principal portion of the driving force transmission mechanism 40 when reading of the image on the document and recording onto the recording sheet are performed simultaneously (in other words, copying pattern). FIG. 15 shows the principal portion of the driving force transmission mechanism 40 when the facsimile device 1 is on standby. In FIGS. 10 through 15, the sun gear or the like are omitted in order to understand the principal portion of the driving force transmission mechanism 40 briefly. As shown in FIGS. 10 and 15, the operational phase of the principal portion of the driving force transmission mechanism 40 at the image reading operation is the same as that at the standby condition.

When the transmission pattern is executed in the facsimile device 1, as shown in FIG. 10, the image reading mode is performed. The switch terminal 81 of the sensor switch 80 is located in the recess 60A formed in the rotary member 45. In the state that the rotation regulating member 51 fits the positioning hole 56E, the drive force transmission path from the planetary gear 46 to the document discharge roller 36 is formed and the document discharge roller 36 is rotated. Further, the drive force transmission path from the planetary gear 46 to the LF roller 32 is formed and the LF roller 32 is rotated. Furthermore, the drive force transmission path from the planetary gear 46 to the document feeding roller 29 is formed and the document feeding roller 29 is rotated.

The LF roller 32, the document discharge roller 36, and the document feeding roller 29 are rotated by the drive force transmitted through the respective path, so as to feed a document along the document feeding path L2. While the document is being fed, an image on the document is read by the CIS unit 34. The read image data is transmitted to another facsimile device under the control of the microcomputer.

When the reception pattern is executed in the facsimile device 1, as shown in FIG. 11, the sheet feeding mode is performed. The switch terminal 81 of the sensor switch 80 is located in the recess 60B formed in the rotary member 45. In the state that the rotation regulating member 51 fits the positioning hole 56A, the drive force transmission path from the planetary gear 47 to the sheet pick-up roller 5 is formed and the sheet pick-up roller 5 is driven. Accordingly, the recording sheet is fed from the sheet stacker 4.

After the recording sheet is fed by a predetermined amount, the recording mode is performed as shown in FIG. 12. The switch terminal 81 of the sensor switch 80 is located in the recess 60C formed in the rotary member 45. In the state that the rotation regulating member 51 fits the positioning hole 56B, the drive force transmission path from the planetary gear 47 to the ribbon take-up spool 21 is formed and the ribbon take-up spool 21 is rotated. Further, the drive force transmission path from the planetary gear 47 to the platen roller 10 is formed, as described above, and the platen roller 10 is rotated. Furthermore, the drive force transmission path from the planetary gear 47 to the sheet discharge roller 17 is formed and the sheet discharge roller 17 is rotated.

The platen roller 10 and the sheet discharge roller 17 are rotated by the drive force transmitted through the respective drive force transmission path to feed the recording sheet while the ribbon 20 is fed by the ribbon take-up spool 21. The image data received from another facsimile device is recorded onto the recording sheet with the thermal head 11.

After the image data has been recorded, as shown in FIG. 13, the sheet discharge mode is performed. The switch terminal 81 of the sensor switch 80 is located in the recess 60E formed in the rotary member 45. In the state that the rotation regulating member 51 fitted the positioning hole 56D, the drive force transmission path from the planetary gear 46 to the sheet discharge roller 17 is formed and the sheet discharge roller 17 is rotated. The recording sheet is discharged by the sheet discharge roller 17 from the facsimile device 1 after the recording is finished.

When the copying pattern is executed in the facsimile device 1, as shown in FIG. 10, the image reading mode is performed. The switch terminal 81 of the sensor switch 80 is located in the recess 60A formed in the rotary member 45. In the state that the drive force transmission path from the planetary path 46 to the document discharge roller 36, the LF roller 32, and the document feed roller 29 are formed and the document discharge roller 36, the LF roller 32, and the document feed roller 29 are rotated. Therefore, the document is fed to a predetermined image reading position (where an image on the document begins to be read) along the document feeding path L2.

Thereafter, as shown in FIG. 11, the sheet feeding mode is performed. The switch terminal 81 of the sensor switch 80 is located in the recess 60B formed in the rotary member 45. In the state that the rotation regulating member 51 fits the positioning hole 56A, the drive force transmission path from the planetary gear 47 to the sheet pick-up roller 5 is formed and the sheet pick-up roller is rotated. The recording sheet is fed from the sheet stacker 4.

After the recording sheet is fed, the copying mode is performed as shown in FIG. 14. The switch terminal 81 of the sensor switch 80 is located in the recess 60D formed in the rotary member 45. In the state that the rotation regulating member 51 contacts the positioning edge 56C, the drive force transmission path from the planetary gear 47 to the document discharge roller 36, LF roller 32, and the document feeding roller 29 are formed and the document discharge roller 36, LF roller 32, and the document feeding roller 29 are rotated. At the same time, the drive force transmission path from the planetary gear 46 to the ribbon take-up spool 21, the platen roller 10, and the sheet discharge roller 17 are formed and the ribbon take-up spool 21, the platen roller 10, and the sheet discharge roller 17 are rotated. An image on the document is read with the CIS unit 34, while the document is being fed. The recording sheet is fed along the sheet feeding path L1, while the ribbon 20 is being fed. The image data read by the CIS unit 34 from the document is recorded onto the recording sheet by the thermal head 11.

After recording the image data read from the document onto the recording sheet, the sheet discharge mode is performed as shown in FIG. 13. The switch terminal 81 of the sensor switch 80 is located in the recess 60E formed in the rotary member 45. In the state that the rotation regulating member 51 fitted the positioning hole 56D, the drive force transmission path from the planetary gear 46 to the sheet discharge roller 17 is formed and the sheet discharge roller 17 is rotated. As described above, the recording sheet is discharged by the sheet discharge roller 17 from the facsimile device 1 after the recording is finished.

The driving force transmission mechanism 40 is placed in the condition as shown in FIG. 10, in the transmission pattern. In the reception pattern, the driving force transmission mechanism 40 is placed in the condition as shown in FIGS. 11, 12, and 13 in the identified order. In the copying pattern, the driving force transmission mechanism 40 is placed in the condition as shown in FIGS. 10, 11, 14, and 13 in the identified order. These conditions of the driving force transmission mechanism 40 are controlled by a CPU in the microcomputer.

Next, a control operation of the driving force transmission mechanism 40 when the operation of feeding a document or a recording sheet is interrupted during the feeding will be described with reference to FIGS. 16 and 17.

Figure 16:
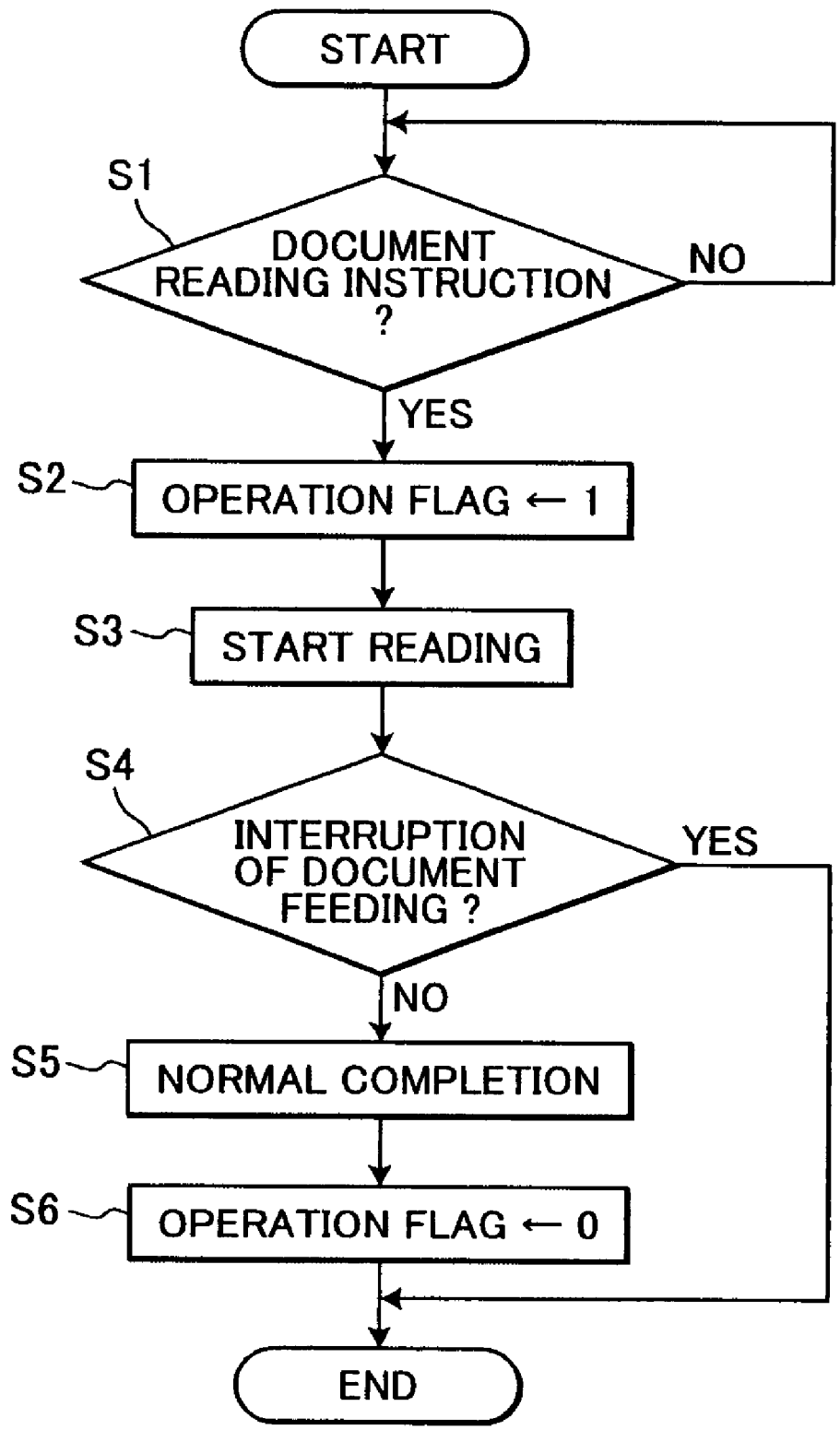
FIG. 16 is a flowchart illustrating operation procedures to be performed when the feeding of a document is stopped due to generation of abnormality in the image reading mode according to the embodiment.
Figure 17:
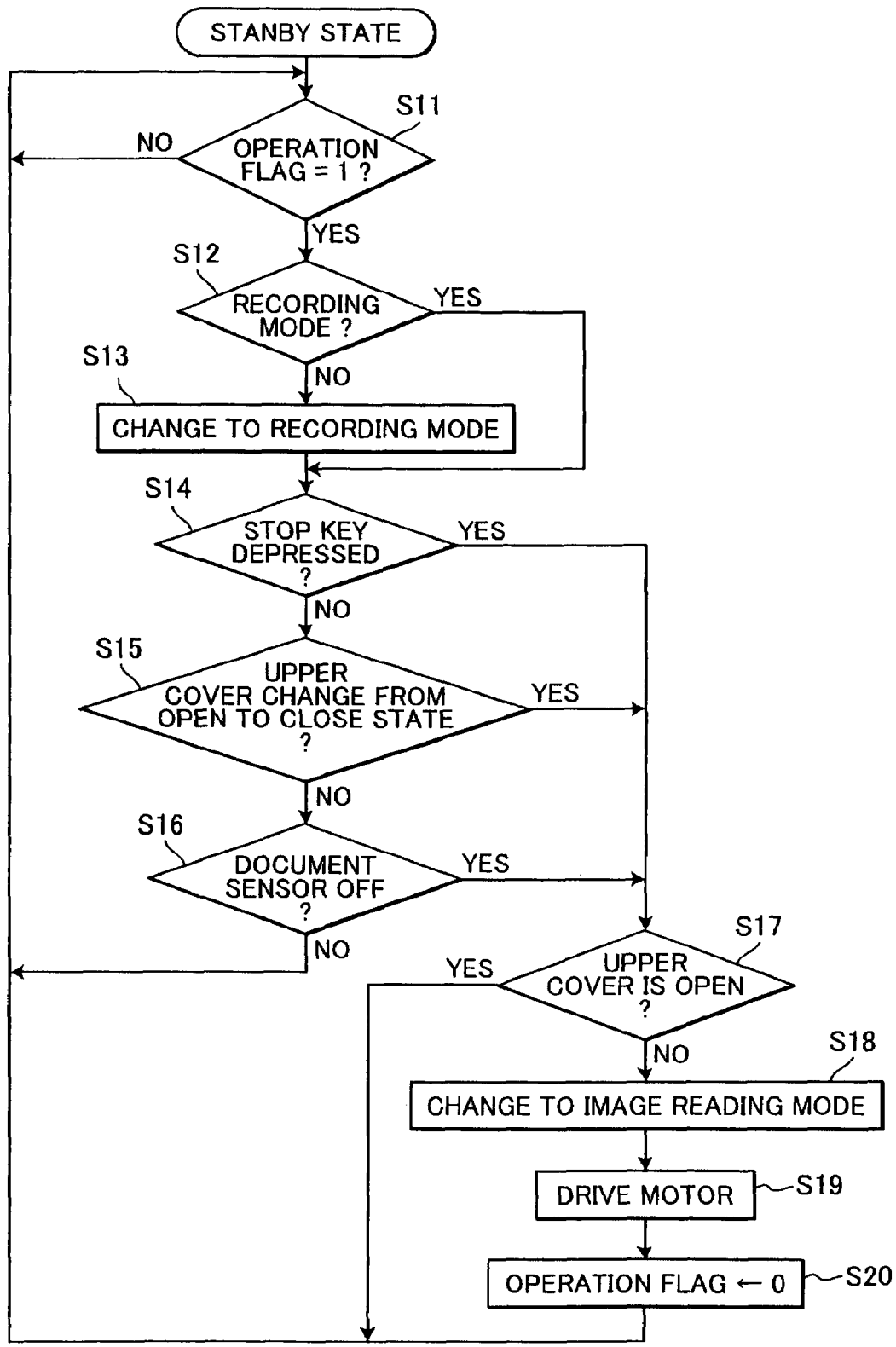
FIG. 17 is a flowchart illustrating a control operation when the device has been placed in a standby state according to the embodiment.

FIGS. 16 and 17 are flowcharts showing control procedures executed in the CPU. FIG. 16 shows, by way of example, a control processing to be performed when the feeding of a document is stopped due to generation of abnormality, such as document jamming, in the image reading mode (to be conducted in the transmission pattern and the copying pattern).

First, the CPU makes a judgment as to whether any document read command has been given by the user or not (S1). For example, when a document is to be read in the above-mentioned transmission pattern, if the user operates the keyboard 38 of the upper panel 23 for document reading, the CPU makes the affirmative judgment (S1: YES), and the operation flag is set to "1" (S2). This operation flag is indicating that the document reading processing is being conducted. Thus, when the document reading processing has been completed in the normal fashion, the CPU sets the operation flag to "0" (S6).

The CPU starts the image reading mode operation in response to a detection signal from the sensor switch 80 while rotating the drive motor 57 (S3). That is, in the image reading mode, the switch terminal 81 of the sensor switch 80 is placed in the recess 60A of the rotary member 45 (See FIG. 10), and the lower end of the rotation regulating member 51 of the regulation member 49 is fitted into the positioning hole 56E of the base plate 41, so that the driving force transmission mechanism 40 is set to the image reading mode.

In this case, driving force transmission paths respectively leading from the planetary gear 46 to the document discharge roller 36, the LF roller 32, and the document feeding roller 29 are formed.

In this state, when the CPU controls the drive motor 57 to rotate the sun gear 43 in the reverse direction, the connection between the sun gear 43 and the rotary member 45 is canceled, and the planetary gears 46 and 47 merely rotate with the sun gear 43 without orbital motion. As a result, the document feeding roller 29, the LF roller 32, and the document discharge roller 36 are rotated through the above-mentioned driving force transmission paths, and the document is fed along the document feeding path L2 as the document feeding roller 29, the LF roller 32, and the document discharge roller 36 are rotated, while the document image is read by the CIS unit 34.

Next, in the image reading mode, the CPU makes a judgment as to whether or not the feeding of the document has been interrupted during the feeding (S4) for monitoring whether or not the document is being fed in the normal fashion. As described below, this judgment is made based on the ON/OFF states of the first document sensor 25a and the second document sensor 33a. In the image reading mode, when the operation has been completed without any interruption of the feeding of the document during the feeding, it is determined that the document reading operation has been completed in the normal fashion (S5), and the operation flag is set to "0" (S6), and the device is made ready for the next operation.

On the other hand, in step S4, when it is determined that the feeding of the document has been interrupted (S4: YES), the device is made ready for the next operation with the operation flag being set to "1". Examples of the factors causing interruption of document feeding during the feeding include the following. That is, for example, generation of document jamming; depression by the user of the STOP key (not shown) of the keyboard 38; generation of sheet jamming during the recording mode operation in the copying pattern; expiration of the ribbon 20 during the recording mode operation; and opening of the upper cover 2 by the user.

In particular, generation of document jamming is to be observed when, for example, after the detection of the document by the first document sensor 25a, the second document sensor 33a detects no document despite discharge feeding of the document by a predetermined amount by the CPU. Alternatively, generation of document jamming is also to be observed when, after the trailing edge of the document has passed the document sensor 25a to bring it into a non-detection state, non-detection state of the document cannot be provided by the second document sensor 33 despite document discharge feeding by a predetermined amount.

In such cases, the CPU alternately gives the following indications through the display portion of the upper panel 23 at predetermined time intervals: "CHECK DOCUMENT. OPEN COVER." and "DRAW OUT DOCUMENT.".

Next, a control operation by the CPU when the device has been placed in a standby state will be described with reference to FIG. 17. Here, the expression of "standby state" refers, for example, to the state in which an operation has been conducted in the normal fashion and input of the next operation command by the user is waited for, or the state in which abnormality has been generated in an operation to stop the operation itself and a recovery operation by the user is waited for.

In the standby state, the CPU makes a judgment as to whether the operation flag is set to "1" or not (S11). When the operation flag is set to "1" (S11: YES), it indicates that the feeding of the document has been interrupted during the document reading operation, so that a judgment is made as to whether the operation mode of the driving force transmission mechanism 40 is the recording mode or not (S12) Then, when the operation mode of the driving force transmission mechanism 40 is not the recording mode (S12: NO), the operation mode is changed to the recording mode (S13). For example, in step S12, when the operation mode is the image reading mode, the driving force transmission path of the driving force transmission mechanism 40 corresponding to the image reading mode is opened, and, in step S13, the driving force transmission path of the driving force transmission mechanism 40 corresponding to the image reading mode is changed to the other driving force transmission path for providing the image recording mode. On the other hand, when the operation mode of the driving force transmission mechanism 40 is the recording mode (S12: YES), the procedure advances to step S14.

Incidentally, when the judgment of step S12 is made first, the procedure advances to step S13 since the operation mode of the driving force transmission mechanism 40 is the image reading mode, and the operation mode of the driving force transmission mechanism 40 is changed to the recording mode in S13. Thereafter, when the judgment is made again in step S12, step S13 is skipped over, and the procedure advances to step S14 since the operation mode of the driving force transmission mechanism 40 has already been changed to the recording mode.

In the processing of step S13, the CPU controls the drive motor 57 to cause the sun gear 43 to rotate in the forward direction, causing the rotary member 45 to rotate in the same direction as the sun gear 43 and placing the switch terminal 81 of the sensor switch 80 at the recess 60C of the rotary member 45 (See FIG. 12).

At this time, driving force transmission paths leading respectively from the planetary gear 47 to the ribbon take-up spool 21, the platen 10, and the sheet discharge roller 17 are formed.

That is, as shown in FIG. 18, the driving force transmission paths leading from the planetary gear 46 to the document discharge roller 36, the LF roller 32, and the document feeding roller 29, formed during document feeding in the image reading mode, are canceled between the planetary gear 46 and the fourth transmission gear 64.

Thus, any components restricting the rotations of document discharge roller 36, the LF roller 32, and the document feeding roller 29 in their rotating direction is released from the associated rollers, so that these rollers can freely rotate in both the forward and reverse directions. As a result, when, for example, document feeding is interrupted due to the generation of document jamming, the user can remove the document smoothly and easily even from the upstream side with respect to the document feeding direction. Thus, a facsimile device 1 superior in operability can be provided.

Further, according to this embodiment, the document can be removed from the document insertion side solely by changing to an operation mode included in the inherent operation modes, so that it is possible to utilize an existing construction, and there is no particular need to add any special circuit device nor a program for a special operation that is different from the inherent modes in order to remove the document from the document insertion side. Thus, increase in component cost and production cost can be avoided.

Referring again to FIG. 17, an operation mode recovery control to be performed when the operation mode is changed to the recording mode (S13) or when the operation mode is the recording mode (S12: YES) will be described.

First, the CPU makes a judgment as to whether or not the stop key (not shown) of the upper panel 23 has been depressed by the user (S14). This judgment is made since, when the feeding of the document is interrupted, the user may depress the stop key in order to reset the current control.

When it is determined that the stop key has not been depressed (S14: NO), a judgment is made as to whether or not the upper cover 2 has been changed from the open to closed state by the user (S15). This judgment is made taking into account the possibility of the user opening the upper cover 2 to inspect the state inside the device when the feeding of the recording sheet is stopped.

When it is determined that the upper cover 2 has not been changed from the open to closed state (S15: NO), a judgment is made as to whether or not both the first document sensor 25a and the second document sensor 33a are rendered OFF (S16). This judgment is made to see whether there is any document in the document path or not. This is done for the purpose of detecting removal of any document by the user when document feeding is interrupted due to jamming of the document.

When it is determined that none of the first document sensor 25a and the second document sensor 33a are OFF (S16: NO), the procedure returns to step S11.

Further, in the case where: it is determined in step S14 that the stop key has been depressed (S14: YES); it is determined in step S15 that the upper cover 2 has been changed from the open to closed state (S15: YES); or it is determined in step S16 that both the first document sensor 25a and the second document sensor 33a are OFF (S16: YES), a judgment is made as to whether the upper cover 2 is in the open state or not (S17).

When the upper cover 2 is not in the open state (S17: NO), the operation mode is returned to the image reading mode (S18), and the drive motor 57 is controlled to perform document discharge operation (S19). Then, the operation flag is set to "0" (S20), and the procedure returns to step S11.

In the step S17, when the upper cover 2 is in the open state (S17: YES), the procedure returns to S11.

In this way, when the feeding of a document is interrupted by jamming, the user can remove the document with the cover 2 being open. Further, if during the feeding of a document the upper cover 2 is brought into the open state, and the feeding of the document is stopped, the device is automatically restored to the image reading mode by bringing the upper cover 2 into the closed state, thereby enabling the document to be discharged.

Further, after generation of jamming during document feeding, when the document is removed from the sheet insertion side by the user with the upper cover 2 being closed, the procedure advances by way of steps S16 and 17 to step S18, where the device is automatically restored from the recording mode to the image reading mode. Thus, it is only necessary for the user to remove the document to restore the device to the image reading mode. This means that there is no need to perform any special operation for mode restoration, thus providing superior operability.

While in the above-described control operation the operation mode concerned is the image reading mode, it is also possible to perform control operation to cut off the driving transmission path when the feeding of a recording sheet is stopped in the sheet feeding mode in copying pattern or reception pattern. That is, in the sheet feeding mode, the planetary gear 47 and the first transmission gear 61 are operationally connected. Therefore, change is effected from the sheet feeding mode to the other operation mode for canceling their driving connection.

Further, while in the above-described control operation the operation mode is changed to the recording mode in order to remove the document from the sheet insertion side, it is possible, instead, to perform control so as to effect transition to another operation mode different from the operation mode during which document jamming or recording sheet jamming has occurred. In short, for removing the jammed document or recording sheet, present operation mode is changed so as to cancel the current driving connection of the current operation mode and to provide other operation mode so as to provide freely rotatable state of the LF roller 32, the document discharge roller 36, the sheet feeding roller 5, the platen 10, the sheet discharge roller 17, etc by removing rotational restriction to the planetary gears 46 and 47 through the intermediation of the transmission gear and the driven gear depending on the present operation mode.

While the invention has been described in detail and with reference to the specific embodiment thereof, it would be apparent to those skilled in the art that various changes and modifications can be made without departing from the scope of the invention. For example, the internal construction of the facsimile device 1 is not restricted to that of the above embodiment.

Further, the device equipped with the driving force transmission mechanism 40 is not restricted to the facsimile device 1. The present invention is also applicable to other device as long as they require gear switching according to a plurality of operation modes. Of course, there is no limitation regarding the kind of operation mode.

Further, while in the above described embodiment two planetary gears 46 and 47 are provided, the number of planetary gears is not limited to two, but various numbers are available.

Further, while in the above embodiment the operation mode is automatically restored from the recording mode to the image reading mode when jamming generated during document reading is removed, a similar arrangement is also applicable to any jamming generated during recording operation.

What is claimed is:

1. An image forming device capable of providing at least a document reading mode and an image recording mode, the image forming device comprising:
   a document feeder that feeds a document in one direction in a document feed path for performing a document reading operation in the document reading mode;
   a recording sheet feeder that feeds a recording sheet in one direction in a recording sheet feed path for recording an image on the recording sheet in the image recording mode;
   a single drive motor;
   a drive force transmission mechanism for selectively transmitting a rotation of the drive motor to one of the document feeder and the recording sheet feeder in accordance with a selected operation mode, the driving force transmission mechanism providing at least a first position and a second position;
   a first power transmission arrangement drivingly connecting the drive force transmission mechanism to the document feeder at the first position of the drive force transmission mechanism;
   a second power transmission arrangement drivingly connecting the drive force transmission mechanism to the recording sheet feeder at the second position of the drive force transmission mechanism, the first power transmission arrangement being disconnected from the drive force transmission mechanism when the second power transmission arrangement is drivingly connected to the recording sheet feeder;
   first detection means that detects interruption of feeding of one of the documents and the recording sheet at respective one of the document feed path and the recording sheet feed path; and
   a control unit that controls the drive force transmission mechanism for switching power transmission between a first transmission phase where the drive motor is drivingly connected to the document feeder through the first power transmission arrangement and a second transmission phase where the drive motor is drivingly connected to the recording sheet feeder through the second power transmission arrangement, the control unit comprising first changing means for changing a current transmission phase to one of remaining transmission phases when the first detection means detects the interruption.

2. The image forming device as claimed in claim 1, wherein the drive motor is rotatable in a forward direction and a reverse direction; and
   wherein the drive force transmission mechanism comprises:
   a sun gear including a first gear drivingly engaged with the drive motor and a second gear coaxially and integrally with the first gear;
   a planetary gear constantly engaged with the second gear and orbitally rotatable about the second gear;
   a rotary member concentric with the sun gear and rotatable in a same direction as the sun gear when the sun gear rotates in the forward direction so as to orbitally rotate the planetary gear around the sun gear, and unrotatable when the sun gear rotates in the reverse direction so as to only allow the planetary gear to rotate on an axis but prevents the planetary gear from its orbital movement, the control unit controlling rotational direction of the sun gear and rotational angular position of the rotary member for determining at least first and second stop positions of the planetary gear, the planetary gear being only engaged with the first power transmission arrangement at the first stop position, and the planetary gear being only engaged with the second power transmission arrangement at the second stop position.

3. The image forming device as claimed in claim 2, wherein the rotating member has an circumference area formed with a plurality of recesses and projections that are one of indented and protruded in a diametrical direction of the rotating member and alternately disposed with each other, each of the recesses and projections having a specific circumferential length, and the driving force transmission mechanism further comprising a sensor switch connected to the control unit, the sensor switch detecting each of the recesses for detecting angular rotational position of the rotary member.

4. The image forming device as claimed in claim 3, wherein the remaining transmission modes comprise a copy mode, a recording sheet feeding mode, and a recording sheet discharge mode, and
   wherein the driving force transmission mechanism further provides a third position, fourth position and fifth position; and
   wherein the image forming device further comprises:
   a third power transmission arrangement engagable with the driving force transmission mechanism at the third position for providing the copy mode;
   a fourth power transmission arrangement engagable with the driving force transmission mechanism at the fourth position for providing the recording sheet feeding mode; and
   a fifth power transmission arrangement engagable with the driving force transmission mechanism at the fifth position for providing the recording sheet discharge mode.

5. The image forming device as claimed in claim 4, wherein the plurality of recesses includes at lease five recesses for defining the operation modes.

6. The image forming device as claimed in claim 1, further comprising a second detecting means that detects a removal of one of the document and the recording sheet whose feeding operation has been interrupted, from respective one of the document feeding path and the recording sheet feed path;
   wherein the control unit further comprises a second changing means that performs switching from the one of the remaining transmission phases to a previous transmission phase during which the first detection means has been detected the interruption for automatically restoring the previous transmission mode.

7. The image forming device as claimed in claim 6, wherein the drive motor is rotatable in a forward direction and a reverse direction; and
   wherein the drive force transmission mechanism comprises:
   a sun gear including a first gear drivingly engaged with the drive motor and a second gear coaxially and integrally with the first gear;
   a planetary gear constantly engaged with the second gear, and orbitally rotatable about the second gear;

a rotary member concentric with the sun gear and rotatable in a same direction as the sun gear when the sun gear rotates in the forward direction so as to orbitally rotate the planetary gear around the sun gear, and unrotatable rotating when the sun gear rotates in the reverse direction so as to only allow the planetary gear to rotate on an axis but prevents the planetary gear from its orbital movement, the control unit controlling rotational direction of the sun gear and rotational angular position of the rotary member for determining at least first and second stop positions of the planetary gear, the planetary gear being only engaged with the first power transmission arrangement at the first stop position, and the planetary gear being only engaged with the second power transmission arrangement at the second stop position.

8. The image forming device as claimed in claim 7, wherein the rotating member has an circumference area formed with a plurality of recesses and projections that are one of indented and protruded in a diametrical direction of the rotating member and alternately disposed with each other, each of the recesses and projections having a specific circumferential length, and the driving force transmission mechanism further comprising a sensor switch connected to the control unit, the sensor switch detecting each of the recesses for detecting angular rotational position of the rotary member.

9. The image forming device as claimed in claim 8, wherein the remaining transmission modes comprise a copy mode, a recording sheet feeding mode, and a recording sheet discharge mode, and wherein the driving force transmission mechanism further provides a third position, fourth position and fifth position; and wherein the image forming device further comprises:

a third power transmission arrangement engagable with the driving force transmission mechanism at the third position for providing the copy mode;

a fourth power transmission arrangement engagable with the driving force transmission mechanism at the fourth position for providing the recording sheet feeding mode; and a fifth power transmission arrangement engagable with the driving force transmission mechanism at the fifth position for providing the recording sheet discharge mode.

10. The image forming device as claimed in claim 9, wherein the plurality of recesses includes at lease five recesses for defining the operation modes.

* * * * *